United States Patent [19]
Sanu et al.

[11] Patent Number: 5,974,409
[45] Date of Patent: Oct. 26, 1999

[54] SYSTEM AND METHOD FOR LOCATING INFORMATION IN AN ON-LINE NETWORK

[75] Inventors: Sankrant Sanu; Alan S. Pearson, both of Redmond, Wash.

[73] Assignee: Microsoft Corporation, Redmond, Wash.

[21] Appl. No.: 08/518,530

[22] Filed: Aug. 23, 1995

[51] Int. Cl.⁶ .................................................. G06F 17/30
[52] U.S. Cl. ................................... 707/3; 707/1; 707/10
[58] Field of Search ..................................... 395/603, 604, 395/605, 606, 609, 610, 187.01, 188.01; 707/1–10

[56] References Cited

U.S. PATENT DOCUMENTS

| | | |
|---|---|---|
| 4,799,156 | 1/1989 | Shavit et al. . |
| 4,933,848 | 6/1990 | Haderle et al. ......................... 395/617 |
| 5,008,879 | 4/1991 | Fischer et al. ........................... 370/401 |
| 5,249,291 | 9/1993 | Williams ............................ 395/188.01 |
| 5,299,123 | 3/1994 | Wang et al. ................................. 707/2 |
| 5,303,361 | 4/1994 | Colwell et al. .......................... 395/604 |
| 5,341,477 | 8/1994 | Pitkin et al. ........................ 395/200.56 |
| 5,347,632 | 9/1994 | Filepp et al. . |
| 5,355,474 | 10/1994 | Thuraisngham et al. ............... 395/609 |
| 5,355,497 | 10/1994 | Cohen-Levy . |
| 5,396,626 | 3/1995 | Nguyen . |
| 5,402,499 | 3/1995 | Robison et al. ......................... 381/119 |
| 5,418,713 | 5/1995 | Allen ........................................ 705/32 |
| 5,590,319 | 12/1996 | Cohen et al. ............................ 395/604 |
| 5,590,395 | 12/1996 | Diekelman ............................ 455/13.1 |
| 5,619,650 | 4/1997 | Bach et al. .......................... 395/200.76 |
| 5,654,516 | 8/1997 | Tashiro et al. ............................ 84/601 |
| 5,659,732 | 8/1997 | Kirsch ...................................... 395/605 |
| 5,701,461 | 12/1997 | Dalal et al. ................................. 707/4 |
| 5,715,443 | 2/1998 | Yanqgihara et al. ....................... 707/3 |

OTHER PUBLICATIONS

Microsoft Press; Computer Dictionary: second edition; p. 304, 1994.
W. Richard Stevens; TCP/IP Illustrated, vol. 1: The Protocols; p. 225–226, 1994.

*Primary Examiner*—Zarni Maung
*Assistant Examiner*—David M. Ovedovitz
*Attorney, Agent, or Firm*—Schwegman, Lundberg, Woessner & Kluth, P.A.

[57] ABSTRACT

The find system of the present invention operates as an extension of a computer's operating system and allows an end-user of an on-line network to enter a search request to locate offerings in different services. In the on-line network, multiple query modules process the search requests by using multiple indexes which associate search terms with offerings in the different services. In addition, multiple find modules balance the processing loads placed on the query modules by selectively routing the search requests to the query modules. In addition to locating offerings in the on-line network, the find system can also establish connections with external data sources and route search requests to the external data sources. Furthermore, the find system provides a fault-tolerant system in which the find modules reroute the search requests to other query modules when errors occur. The find system also contains an indexing module which executes on separate processors and allows service providers to create specialized indexing schemes. These specialized indexes are then periodically updated and transferred to the query modules using techniques which allow search request processing during the update process. Still further, the find system provides an improved method of obtaining up-to-date security clearances for located offerings.

62 Claims, 26 Drawing Sheets

CLIENT QUERY MESSAGE

CONNECTION QUERY MESSAGE

RESPONSE MESSAGE

INDEXED SERVICES TABLE ~600

| INDEXED SERVICE IDENTIFIER | LIST OF CONNECTION SERVERS | INDEX NAME |
|---|---|---|
| 0X0001H | CONNECTION SERVER 1, CONNECTION SERVER 2, | INDEX 1 |
| 0X0002H | CONNECTION SERVER 1, CONNECTION SERVER 2, | INDEX 2 |
| ⋮ | ⋮ | ⋮ |

CONNECTION SERVER TABLE 700

| CONNECTION SERVER NAME | INDEXED SERVICE IDENTIFIER | CONNECTIONS | NUMBER OF CONNECTIONS |
|---|---|---|---|
| CONNECTION SERVER 1 | 0X0001H 0X0002H | CONNECTION BLOCK 1 | 32 |
| CONNECTION SERVER 2 | 0X0001H 0X0003H | CONNECTION BLOCK 2 | 32 |
| ... | ... | ... | ... |

SELECT DATA CONNECTION

INDEX TABLE 1900

| NAME | INDEXED SERVICE IDENTIFIER | CONNECTION | INDEX LIBRARY |
|---|---|---|---|
| CONNECTION SERVER 1 | 0X0001H<br>0X0002H | $C_{13}$ | DSINDEX.DLL<br>DSCOPY.DLL |
| CONNECTION SERVER 2 | 0X0002H | $C_{14}$ | DSCOPY.DLL |
| CONNECTION SERVER 3 | 0X0003H | $C_{15}$ | DSINDEX.DLL |

INDEX SCHEDULE TABLE

| TIME | CONNECTION SERVER LIST |
|---|---|
| 8:00 am | (CONNECTION SERVER 1, INDEX1)<br>(CONNECTION SERVER 2, INDEX1) |
| 10:00 am | (CONNECTION SERVER 3, INDEX2) |
| 6:00 pm | (CONNECTION SERVER 1, INDEX3)<br>(CONNECTION SERVER 2, INDEX3)<br>(CONNECTION SERVER 3, INDEX3) |

FIG. 20

UPDATE THREAD

DSINDEX.DLL

THE NODE BROKER

SYSTEM AND METHOD FOR LOCATING INFORMATION IN AN ON-LINE NETWORK

BACKGROUND OF THE INVENTION

1. Field of the Invention

This invention relates to on-line network communication systems and, more particularly, to a system for locating information in an on-line network.

2. Background

Commercial, interactive on-line networks are rapidly expanding in size. Consequently, a large number of end-users often spend a significant amount of time locating desired services, data files, and other information in such on-line networks. With the expansion of on-line networks and the increasing amounts of information content provided in such networks, users need a simple, efficient and quick mechanism for finding desired offerings.

In general, conventional on-line networks attempt to provide "find programs" which help reduce the amount of time a user spends looking for information. Typically, such find programs index the content of an on-line network to create a search index. The search index is a table which associates a list of words with the location of the words in the on-line network.

To locate an offering, an end-user enters search terms into the find program. The search terms typically relate to the name or topic associated with a desired offering. In response, the find program searches its search index to locate the offerings identified by the search terms. The find programs then display the list of located offerings.

While such find programs improve the process of locating offerings, they suffer from a number of disadvantages. For example, as the number of offering in the on-line network grow, the size of the indexes also grow. Creating, updating and searching large indexes tax the processing resources of the on-line network. In addition, as the number of users increase, the number of search requests also increase, further taxing the processing resources of the on-line network. As a result, response times degrade resulting in higher telecommunication costs and user frustration.

In addition, users of on-line networks currently desire a wide variety of information content. Consequently, a single entity cannot economically provide all the content offered in an on-line network. Thus, many on-line network providers have attempted to supplement the content of their on-line networks by providing access to external databases. For example, many on-line networks also provide access to external databases existing in the Internet. Accordingly, on-line network providers need a find system which allows users to not only locate information within the commercial on-line network, but also locate offerings associated with external sources of information.

Still further, the wide variety of offerings in conventional on-line networks complicates the process of creating and updating search indexes. For example, some services, such as interactive games, contain only small amounts of textual data, while other services, such as on-line newspapers, contain large amounts of textual data and images. Consequently, a single indexing scheme cannot optimally index the wide variety of offerings available in current on-line networks. Accordingly, on-line network providers need a cost-effective, flexible and extensible system which can create different search indexes.

SUMMARY OF THE INVENTION

The present invention provides an enhanced find system and method for locating offerings within an interactive on-line network. Furthermore, the find system of the present invention operates on multiple machines within an on-line network. This multiple machine implementation enhances index creation and updating, speeds response times and improves error handling.

The find system of the present invention allows a user to enter a search query at an end-user station. The end-user station sends the search query to the on-line network, the on-line network processes the search query and sends the results back to the end-user station. Preferably, the present invention comprises several component modules which include: a computer shell module, a find module, multiple query modules (also called connection modules), an index module and a node broker module.

The computer shell module runs on the end-user station and provides the user interface which appears on a user's computer. In the preferred embodiment, the computer shell module is the Windows 95 operating system developed by the Microsoft Corporation. Thus, the computer shell module provides the software instructions and data structures which create a windows oriented user interface.

The find module is subdivided into two portions. One portion runs on the end-user station and is called the find client. The other portion executes on the on-line network and is called the find service. The find client and find service communicate with each other via a wide area network. The find client interacts with the computer shell to provide a user interface for inputting search requests and displaying search results.

Preferably, the find client includes the software instructions for directing the computer shell to create a find dialog box. The find dialog box is a special window displayed by the computer shell to solicit a response from the user. For example, the find dialog box directs a user to input search terms and select specific categories.

The user inputs a search request (also called a search query) by entering search terms such as, for example, the name of an offering, the type of an offering, a preferred category, and the like. For example, a user can enter the word "mortgage" as one of the search terms in the search request. The present invention then processes the search request and locates all the offerings with the word "mortgage" contained therein. Once a user has entered a search request, the find client module sends the search request to the find service on the on-line network.

The find service in the on-line network receives the search requests. The find service contains the software instructions and data structures which monitor the processing of the search requests. Preferably, the find service routes the search requests to multiple query modules and monitors the processing of the search requests by the query modules. Thus, the present invention separates the routing and monitoring of the search requests (performed by the find service) from the processing of the search requests (performed by the query modules).

The separation of the administration of the search requests from the execution of the search requests enhances error recovery. When an error in one of the query modules occurs, the find service reroutes the search request to another query module. In addition, the find service enhances the performance of the query modules by directing the query modules to process the search requests in parallel.

The query modules take advantage of recent advances in multitasking operating systems. In general, a multitasking operating system allows a single machine to work on more than one task at one time. Thus, with a multitasking operating system, the query module runs multiple search engines in separate threads of execution such as different operating system threads. Each search engine is an executable program which searches an index. Preferably, the search engines execute in the query module.

In addition, each query module creates and maintains multiple connections which link the find service with the search engines in the query module. A connection is a communications link which directs a stream of data from one module to another module. Thus, the find service routes search requests to the search engines in the query module via the connections.

In the present invention, the query modules also establish connections with external data sources. These connections allow the find service to route a search request to the external data sources. Preferably, the connections use the communication protocols established by external data sources. Thus, the present invention allows an end-user to locate offerings existing in the on-line network or locate offerings in external data sources. For example, a user of the present invention can locate offerings existing in the on-line network and offerings existing in external data sources such as the Internet.

In addition, the present invention provides a distributed find system which allows multiple query modules to simultaneously process different search requests. This unique distributed implementation is flexible and extensible. For example, as the on-line network grows in size, the on-line network provider can easily add new query modules to improve response times.

For example, some indexes are larger than other indexes. In addition, some indexes are accessed more often than other indexes. As an index grows in size or is accessed more often, the load on the query module searching that index increases. To reduce the load, copies of the indexes can be distributed to other query modules, thus allowing multiple query modules to simultaneously search copies of the same index.

A still further feature of the present invention provides a self-tuning distributed find system. Because the search indexes are copied to different query modules, the find module can tune the processing loads on the query modules by selectively directing the search requests to different query modules. Preferably, the find system uses a round robin technique when routing search requests to the search engines in the query modules. However, other embodiments may use a variety of techniques such as dynamic load balancing and the like. These unique self-tuning approaches maximize the performance of the query modules.

Turning now to the creation of the search indexes, the index module of the present invention creates and updates the search indexes. The index module contains the indexes, software instructions and data structures which accommodate a variety of indexing schemes used to update the indexes in the search engines. In addition, the index module executing in entirely different machines than the query modules.

The separation of the index modules from the query modules provides a number of advantages. For example, the processing of the search requests by the query modules continues while the index module creates new indexes or updates existing indexes. In addition, the separation of the index module from the query modules reduces the degradation in performance that occurs when the updating of a search index is executed on the same machine as the processing of the search requests.

When the index module updates an existing index, the index module implements a unique mechanism for copying the updated index into the query modules. Preferably, the index module notifies the query module and the find module that an updated index exists. In response, the find service then routes search requests to the other query modules. The updated index is then copied to the idled query module. In other embodiments, the index is updated while the query module remains in an idled state. Alternatively, the index can be incrementally or non-destructively updated so as to incorporate the changes to the index since the last update.

Once loaded with the updated index, the query module reestablishes the connections with the find module. Once the connections are reestablished, the find module routes additional search requests to the search engines in the updated query module. This continues until each query module has been updated. Advantageously, this unique updating mechanism allows the processing of the search requests to continue while updating the query modules.

Furthermore, to improve the performance of processing the search requests, it is possible to use different indexing schemes to index different types of services. For example, the indexing scheme for locating an offering in a main content catalog may differ from the indexing scheme for locating the content of messages in a bulletin board service. The index module of the present invention provides a unique indexing architecture which accommodates a variety of indexing schemes tailored to the content stored in the different services. Accordingly, the present invention is capable of creating different indexes for different portions of the on-line network.

The offerings in an on-line network, however, are constantly changing. Because the search indexes are periodically updated at predetermined update intervals (i.e, every evening, every two hours, etc.), a search index does not include new changes until the next update. As a result, the index may not contain an offering's up-to-date properties such as the node's current name or description.

For example, one embodiment of the present invention overcomes the problems associated with periodic indexing by generating search results that contain offering identifiers. The offering identifiers uniquely identify each offering located by the index. The find client module receives the offering identifiers and communicates with the services to obtain the up-to-date properties of the identified offerings and the status of the service associated with the offerings. The status can include for example, the state of a service in an external data source such as the Internet or the state of a service existing in the on-line network. The up-to-date properties are then displayed by the find client module. In one embodiment, the find client module communicates with the services to obtain the up-to-date properties of a located offering and perform security checking.

Security problems can arise when security access rights have changed since the index was last updated. To obtain up-to-date security clearances, one approach is to perform a two stage security check that 1) relies on a user's security clearance when locating offerings in the search index and 2) accesses each of the located offerings to obtain their up-to-date security clearances. In the first stage, the end-user's security clearance is used as one of the search terms in the search request. As a result, the find system only locates those offering identifiers in the search index with the user's security clearance. These offering identifiers are then sent to the end-user computer.

Because modifications made after an update do not exist in the search index, the find system proceeds to the second stage and directs a service to obtain the located offering's up-to-date properties and to perform a security check on the up-to-date security clearances. The service compares the security clearance of the user with the up-to-date security clearances of the offerings. Only the properties of those offerings with the proper security clearances are sent to the end-user.

This second stage, however, is time consuming because the offerings are typically associated with different services such that the end-user computer must direct multiple services to perform the up-to-date security checks. Consequently, to obtain the properties of the located offerings with the proper security clearances, the end-user computer must load and execute the software modules which communicate with each service.

An alternative embodiment of the present invention improves the second stage with a node broker module which exists in the on-line network. When the end-user computer receives the offering identifiers in the search results, the end-user computer sends the offering identifiers to a specialized node broker module that contains a set of software instructions designed to obtain 1) each identified offering's up-to-date properties and 2) perform security checking.

Preferably, the node broker module communicates with the services and obtains the up-to-date security clearances for the offerings identified in the search results. The node broker module also performs a security check and identifies the offerings with the proper security clearances. The node broker module then sends the up-to-date properties which passed the security check, to the find client module. This greatly improves performance because the end-user computer does not need to establish the communication connections with different services to direct the services to perform the up-to-date security checks.

In an alternative embodiment, the node broker module automatically performs a security check and identifies the offerings with the proper security clearances. The node broker module then sends the up-to-date properties which passed the security check, to the find client module. Instead of having to communicate with the services or the node-broker, the end-user computer simply displays the up-to-date properties.

BRIEF DESCRIPTION OF THE DRAWINGS

These and other aspects, advantages, and novel features of the invention will become apparent upon reading the following detailed description and upon reference to accompanying drawings in which:

FIG. 6 illustrates an indexed service table created by a preferred embodiment of the present invention;

FIG. 7 illustrates a connection server table created by a preferred embodiment of the present invention;

FIG. 19 illustrates an index table created by a preferred embodiment of the present invention;

FIG. 20 illustrates an index schedule table created by a preferred embodiment of the present invention;

Figure 1:
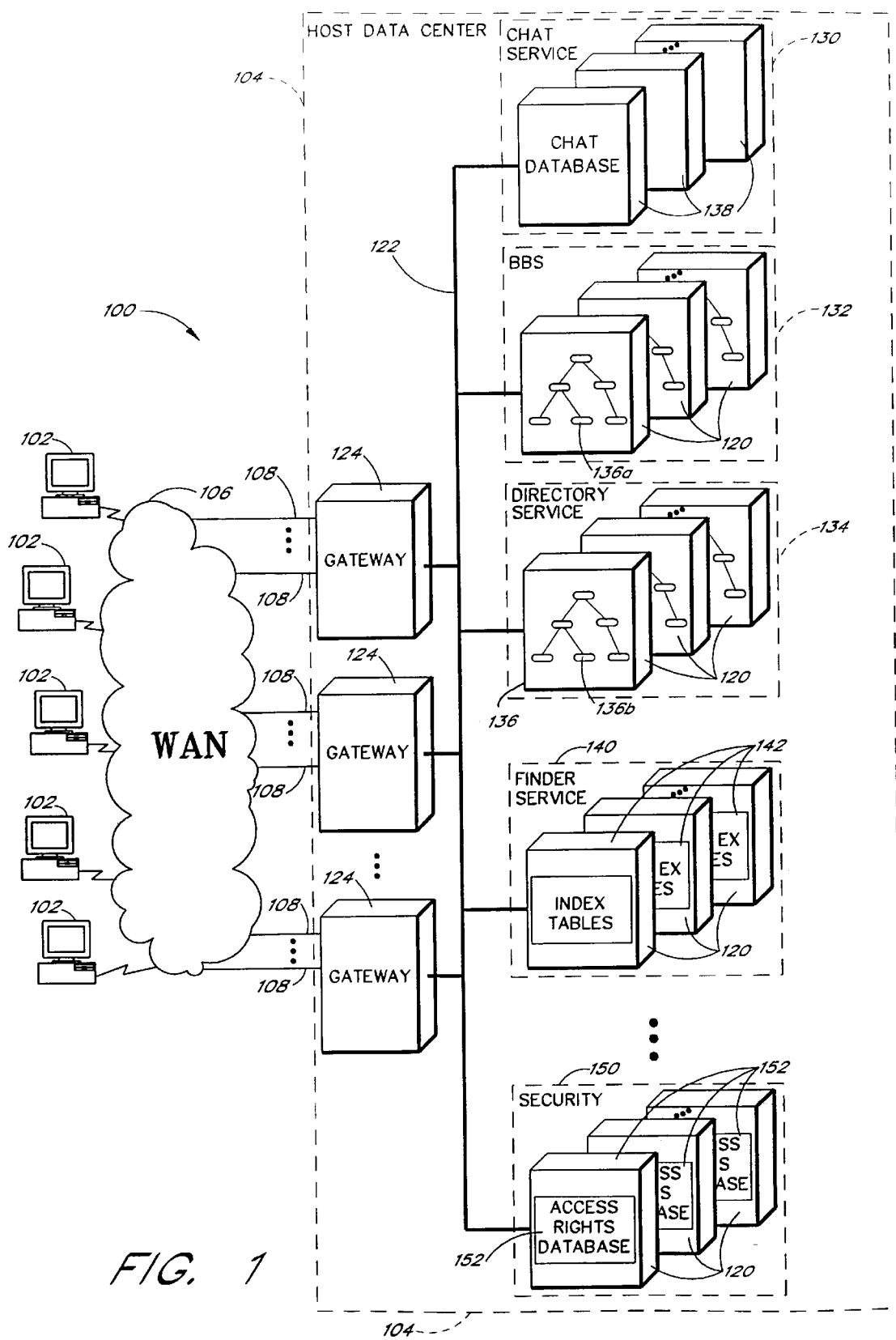
FIG. 1 is a high level drawing illustrating the architecture of an on-line network.

In the drawings, the first digit of any three-digit number indicates the number of the figure in which the element first appears. For example, an element with the reference number 402 first appears in FIG. 4. Where four-digit reference numbers are used, the first two digits indicate the figure number.

DETAILED DESCRIPTION OF THE PREFERRED EMBODIMENTS

The detailed description which follows is broken up into the following sections: Architectural Overview Of An On-line System Appropriate For Use With The Find System, Organization Of The On-line Network Content, The Find System, Creating And Updating Indexes and Validating Security Clearances.

I. Architectural Overview Of An On-line System Appropriate For Use With The Find System This section provides an overview of the on-line network in which the present invention is employed. The architecture of this network is further described in commonly-assigned copending U.S. application Ser. No. 08/472,807, having the title ARCHITECTURE FOR SCALABLE ON-LINE SERVICES NETWORK, filed Jun. 7, 1995 which is hereby incorporated herein by reference.

FIG. 1 is a high level drawing illustrating the architecture of an on-line network 100 appropriate for use with the find system of the present invention. The on-line network 100 includes multiple end-user stations 102 connected to a host data center 104 by one or more wide area networks (WANs) 106. The wide area network 106 of the preferred embodiment includes wide area network (WAN) lines 108 which are provided by one or more telecommunications providers. The wide area network 106 allows users of the end-user stations 102, dispersed over a wide geographic area, to access the host data center 104 via a modem.

The host data center 104 comprises a plurality of servers 120 connected to a high speed local area network (LAN) 122. Also connected to the local area network 122 are multiple gateways 124 linking incoming calls from end-users to the servers 120. In the preferred embodiment, the servers 120 and the gateways 124 are Pentium-class (or better) microcomputers which run the Windows NT operating system available from Microsoft Corporation.

The servers 120 typically have at least 128 MB of random-access memory (RAM) and at least 4 GB of disk space. Processing power may vary from server 120 to server 120. For example, one server 120 may have four 100 Mhz processors, while another server 120 may have one 90 Mhz processor. Each gateway 124 typically has at least 64 MB of RAM and at least 2 GB of disk space, and is capable of supporting approximately 1000 simultaneous end-users at T1 (1.544 Mbps) or greater data rates. The local area network 122 is preferably a 100 Mbps LAN based on the CDDI (Copper Distributed Data Interface) standard. The CDDI specification is a variant of the well-known ANSI Fiber Distributed Data Interface specification, but uses a single copper ring instead of a dual fiber ring.

Various other types of servers 120 and other microcomputers are connected to the LAN 122 but are not shown in FIG. 1. For example, billing and logon servers 120 are provided to record billable events and to handle end-user logons. Further, arbiter microcomputers are provided to perform transaction replication services for certain service groups, allowing the application servers 120 of such service groups to store identical copies of the same service content data.

In a preferred embodiment, each service group corresponds to a particular service. Each server of a service group is preferably a "replicated" version of the other application servers within the service group, meaning that each runs the same server application (or server applications) as the others to implement a common service. For example, application servers within a bulletin board system ("BBS") service group all run a BBS server application. A service group may have as few as one application server. Further, a given server can handle multiple services, and can thus be simultaneously allocated to multiple service groups.

During a typical logon session, an end-user subscriber maintains a communications link with a single gateway 124, but may access multiple service applications (and thus communicate with multiple servers 120). The gateway 124 translates messages between the protocol of the wide area network 106 and the protocol of the local area network 122 and establishes connections between an end-user station 102 and a particular server 120.

The host data center 104 provides a variety of communications-based and information-based services to end-users. A service is any service provided in an on-line environment. Typical services include, for example, a chat service 130, a bulletin board service 132, a DirSrv service 134, a find service 140, a security service 150 and other services not shown such as an electronic mail service, a media view service, an interactive game service and various information services.

Preferably, the services in the on-line network 100 are implemented as client-server applications, with server portions (or "server applications") running on the application servers, and with client portions (or "client applications") running on the end-user stations 102. The architecture features a high degree of scalability, allowing the capacity of the network to be scaled (without degrading the services) as the number of end users increases over time.

The find service 140 locates offerings in the on-line network 100. The DirSrv service 134 provides the hierarchical data structure of the main content catalog of the on-line network content. The bulletin board service 132 (BBS) allows end-users to post and review bulletins on specific topics and also provides a hierarchical data structure of the bulletin board service 132 content. With the bulletin board service 132, end-users conduct non-real-time conversations by posting messages to different bulletin boards. The chat service 130 contains a chat room database 138 which allows end-users to communicate in real time with one another in chat rooms. Typically, the chat rooms are dedicated to specific topics.

The services offered to end-users of the on-line network 100 are in the form of client-server application programs. The client applications execute on the end-user stations 102 while the service applications execute on one or more of the servers 120. In the presently preferred embodiment, the client applications are implemented as Windows 95 executables and the server portions are implemented as dynamic link libraries which execute under the Microsoft Windows NT operating system.

In one embodiment, the on-line network 100 does not offer the security service 150 directly to end-users of the on-line network 100. Instead, the security service 150 communicates with other services to provide access rights data. The security service 150 maintains an access rights database 152 which contains the access rights data for all end-users of the network 100. Each security service 150 runs Structured Query Language (SQL) code to provide access to its respective access rights database 152. The structured query language is a language standardized by the International Standards Organization (ISO) for defining, updating and querying relational databases. A query to the access rights database 152 can emanate either from one of the other service applications (when, for example, an end-user attempts to access a node which is stored by the service application), or by one of the gateways 124 (when an end-user attempts to open a service).

II. Organization Of The On-line Network Content

As illustrated in FIG. 1, the application services contain offerings and information content. For example, the DirSrv service 134 and the bulletin board service 132 contains a hierarchical data structure (also called a service namespace)

136 similar to a hierarchical tree. Each item in the hierarchical data structure 136 is referred to as a "node." In the preferred embodiment, the service namespaces 136 are acyclic graphs which allow the linking of nodes on one branch of a service namespace 136 to reference nodes on other branches of the same service namespace 136 or to reference nodes on the branches of other service namespaces 136.

As explained in more detail below, the DirSrv namespace 136b provides the main content catalog of the on-line network content. The top level of the DirSrv namespace 136b organizes the on-line content into general classifications while each successive layer defines more detailed subcategories. The bulletin board service namespace 136a organizes the bulletin boards into different classifications and also organizes the messages posted in each bulletin board.

Figure 2:
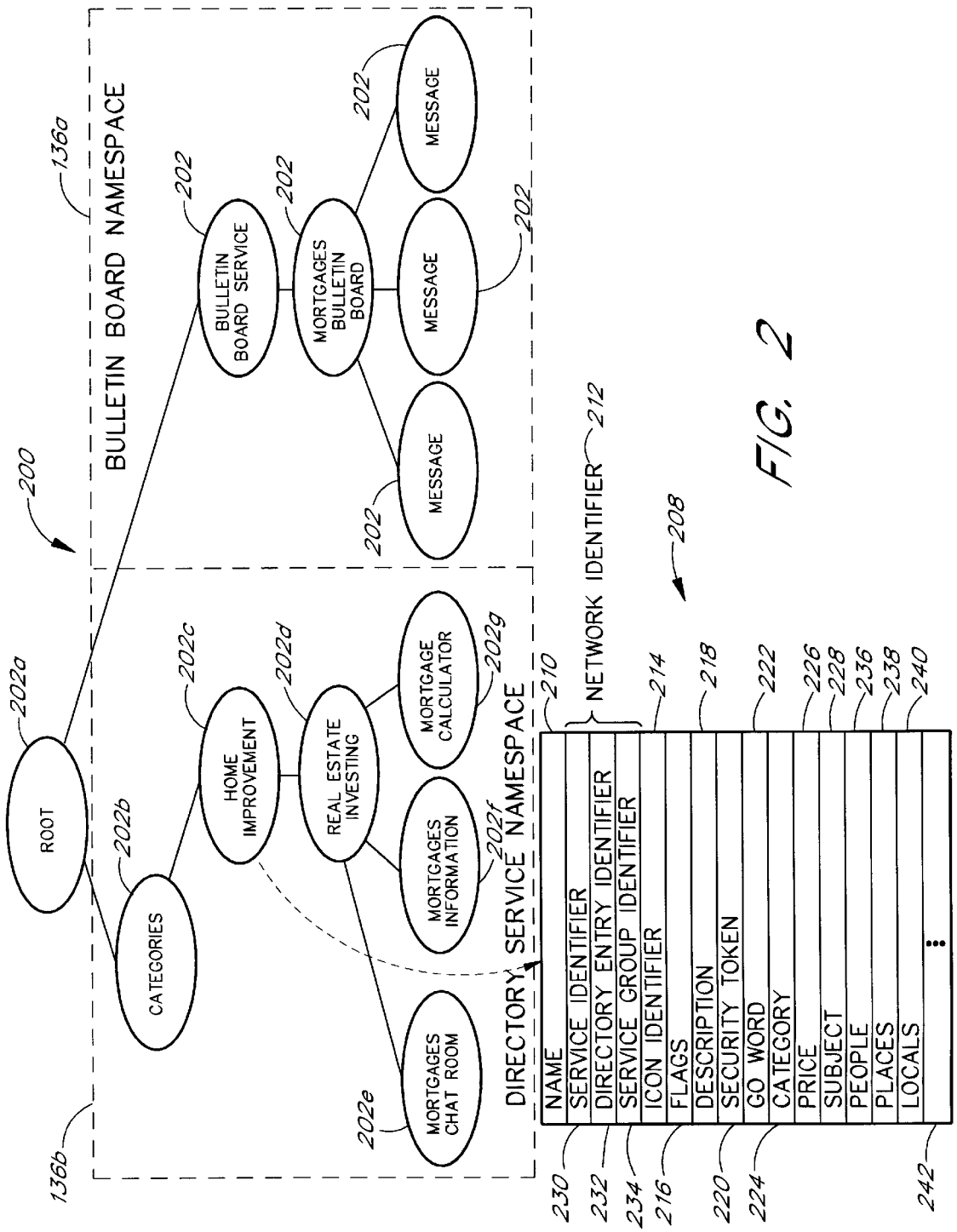
FIG. 2 is a block diagram illustrating one embodiment of the hierarchical data structure existing in the on-line network accessed by the present invention.

As illustrated in FIG. 2, the entire hierarchical data structure 200 of the on-line network 100 acts as a network abstraction layer which hides the hardware-dependent details such as the gateways 124 and the servers 120 which comprise the on-line network 100. In this example, the on-line network 100 includes a root node 202a and the DirSrv namespace 136b. The DirSrv namespace 136b provides the hierarchical tree structure for the content existing within the DirSrv service 134. Likewise, the bulletin board service namespace 136a (not shown) provides the hierarchical data structure for the content existing within the bulletin board service 132.

For example, the DirSrv namespace 136b illustrated FIG. 2 contains a "categories" node 202b. The categories node 202b contains a "home improvement" node 202c. The "home improvement" node 202c contains a "real estate investing" node 202d. In addition, programs, documents and images are also represented as nodes. In this example, the real estate node 202d contains a mortgages chat room node 202e, a mortgage information node 202f and a mortgage calculator node 202g.

In the preferred embodiment, each node contains a set of node properties 208. The set of node properties 208 contains the node's name 210, a network identifier 212, an icon identifier 214, flags 216, a description 218, a security token 220, a go word 222, a category 224, a price 226, subject 228, people 236, places 238, locals 240 and other items 242. The node's name 210 is a human readable name such as the "Real Estate Investing" name in the real estate investing node 204d.

The network identifier 212 is a 128-bit number which comprises a service identifier 230 (also called an application identifier 230), a directory entry identifier 232 and a service group identifier 234. The service identifier 230 is a 32-bit number which identifies a particular service namespace 136. Thus, in the preferred embodiment of the present invention, the service identifier 230 uniquely identifies up to approximately four billion ($2^{32}$) service namespaces 136. As described in more detail below, if the service identifier 230 relates to an indexed service it is called an indexed service identifier 230.

TABLE 1

| SERVICE IDENTIFIER | DEFINED MEANING |
| --- | --- |
| 0x0001H | DirSrv Namespace |
| 0x0002H | Bulletin Board Service Namespace |
| 0x0003H | Root Node |

TABLE 1-continued

| SERVICE IDENTIFIER | DEFINED MEANING |
| --- | --- |
| 0x0004H | Chat Room |
| 0x0006H | MediaViewer |
| 0x0007H | Download and Run |
| 0x000BH | Encarta |
| 0x000CH | Book Shelf |

Currently, eight service identifiers 230 identify the eight different services in the current embodiment of the present invention. The value of the eight service identifiers are shown in a hexadecimal format. As the on-line network grows, it is envisioned that the on-line network provider will define additional service identifiers 230.

The directory entry identifier 232 (hereinafter called an offering identifier 232) is a 64-bit number which uniquely identifies each node 202 in a particular service namespace 136. The offering identifier 232 of the present invention advantageously identifies up to approximately 18 billion, billion ($2^{64}$) nodes 202 within a service namespace 136. The service group identifier 234 is a 16-bit number which advantageously identifies a group of servers 120.

The icon identifier 214 identifies the icon image or bit-map associated with a node 202. The flags 216 identify the node type. The description 218 is a variable length field which provides a brief summary of a node's contents. The security token 220 is a four-byte value which identifies a node's access rights. When an end-user attempts to access a node 202, the node's security token 220 and the end-user's 32-bit account number are used to determine the end-user's access rights with respect to the node 202.

The security tokens 220 are preferably stored by the DirSrv service 134 as node properties. In the preferred implementation of the on-line network 100, the on-line network provider defines the security tokens 220 as needed, and stores the security tokens 220 as node properties 208. For example, the nodes 202 of a service namespace 136 can either be assigned their own security token 220 (to allow separate security for the area), or can use an existing security token 220, such as the security token 220 of the node's parent node 202. The go word 222 uniquely identifies a service in the on-line network 100. The price 226 defines the costs for accessing the content contained in a node 202.

The subject property 228 provides key words that identify a subject. The people property 236 can include the names of relevant people associated with the node 202. For example, if a node 202 contains information about a movie, the people property 236 can include the names of the actors and actresses that played roles in the movie. The places property 238 identifies a particular geographical location such as a country or state. The locals 240 define the language associated with a node 202. The other items 240 include other properties which a service provider can define.

III. The Find System

The service namespaces 136 will become enormous hierarchical data structures. Accordingly, the present invention provides an enhanced system and method for locating offerings within an interactive on-line network. The present invention provides a cost effective, extensible and distributed find system which allows end-users to locate offerings in the different service namespaces 136.

A. The Find System Architecture

Figure 3A:
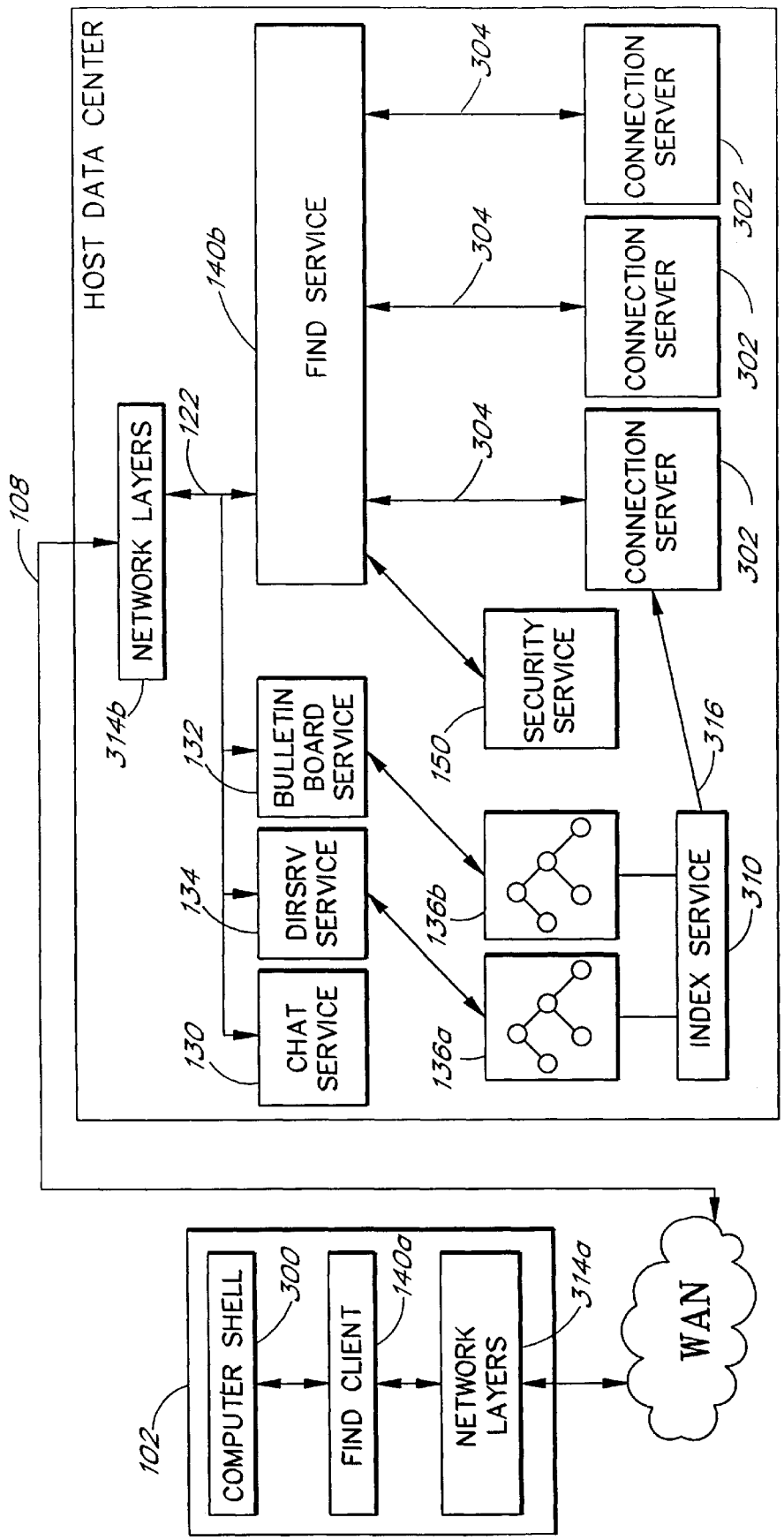
FIG. 3A is a block diagram illustrating the architecture of a preferred embodiment of the present invention.
Figure 3B:
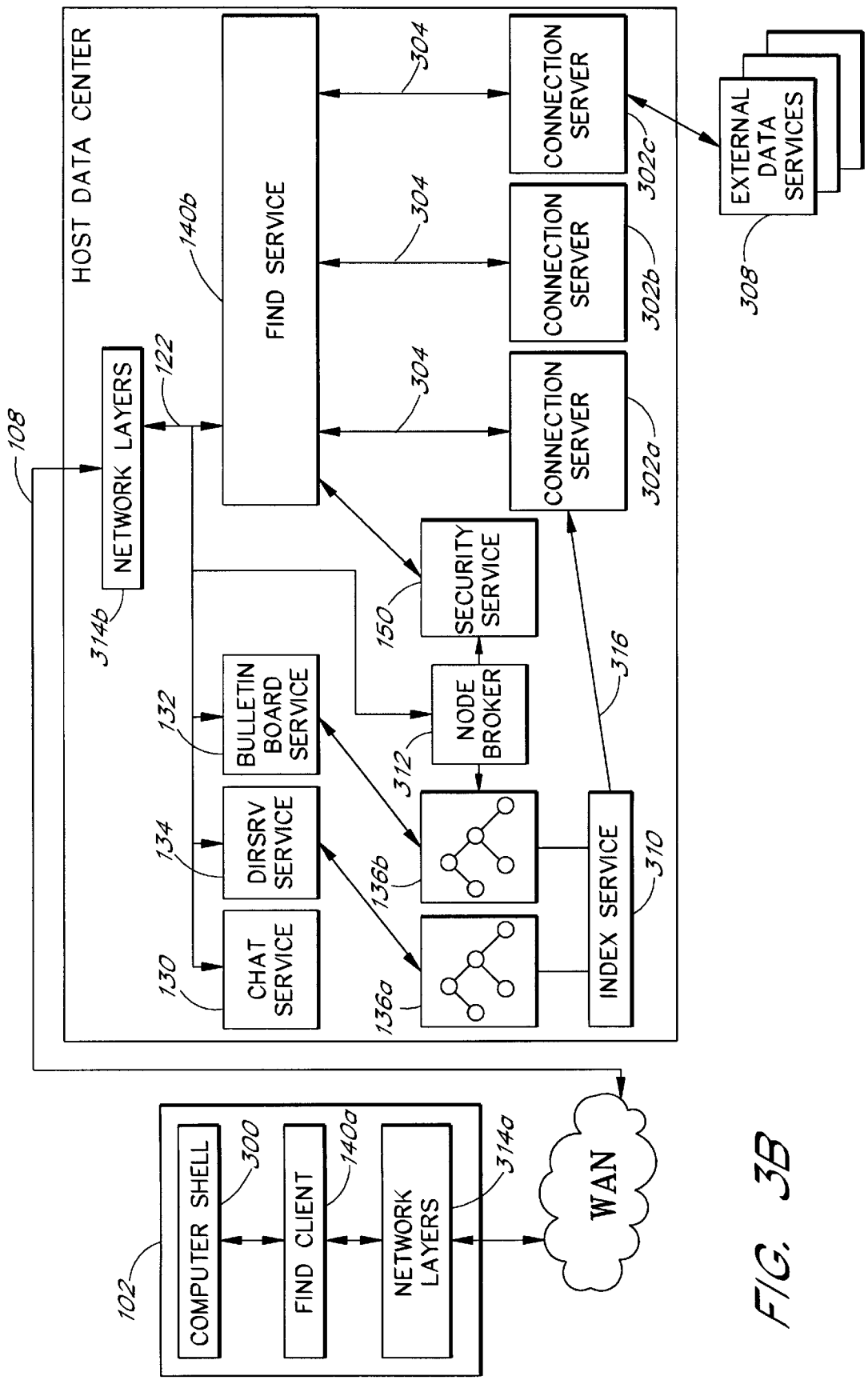
FIG. 3B is a block diagram illustrating another embodiment of the present invention.

FIG. 3A illustrates a block diagram of the find system in a preferred embodiment of the present invention. The present invention generally contains multiple modular components in both the end-user stations 102 and the host data center 104. In the end-user stations 102, the present invention includes a computer shell module 300 and a find client module 140a. In the host data center, one embodiment of the present invention includes a find service module 140b, multiple query modules (also called connection servers) 302, an index service module 310. In another embodiments, as illustrated in FIG. 3B, the host data center also includes an external data source 308 and a node broker module 312.

In the present invention, the client network layers 314a in the end-user station 102 and the service network layers 314b in the host data center manage the communications between the find client module 140a and the find service module 140b. The client network layers 314a in the end-user station 102 communicate via a modem over the wide area network 106 with the service network layers 314b in the host data center 104. A person of ordinary skill in the art will appreciate that the client network layers 314a and the service network layers 314b can be implemented using any number of different protocols and computer configurations without departing from the scope of the present invention.

The find client module 140a (hereinafter referred to as the find client 140a) of the present invention allows a user to enter a search request at an end-user station. The end-user station sends the search request to the find service 140b. The computer shell module 300 (hereinafter referred to as the computer shell 300) runs on the end-user station and provides the user interface which appears on a user's computer. In the preferred embodiment, the computer shell 300 is the Windows 95 operating system developed by the Microsoft Corporation. The software which implements a user interface is called a shell. Thus, the computer shell 300 is the set of software instructions which (1) create the visual display and (2) process the end-user's input commands on the end-user stations 102. For example, the user can direct the computer shell 300 to locate files, invoke programs and the like.

As described in more detail below, the end-user can select the find client 140a from within the computer shell 300. In the present invention, the end-user selects a menu option or icon to invoke the find client 140a. In other embodiments, the find client 140a is not integrated into the computer shell user interface and is invoked in the same manner as other programs. In the preferred embodiment, when the end-user selects the find client 140a, the computer shell 300a launches the executable file containing the find client 140a software instructions. As described in more detail below, once the computer shell 300a invokes the find client 140a, the find client 140a interacts with the computer shell 300 to provide a user interface for inputting search requests and displaying search results. Other embodiments, the find client 140a does not interact with the computer shell 300; instead, the find client 140a provides its own user interface or a user interface that differs from the user interface of the computer shell 300. In addition, the find system of the present invention does not necessarily need a user interface. For example, other client applications may access the find system to obtain the location of desired offerings.

Figure 4A:
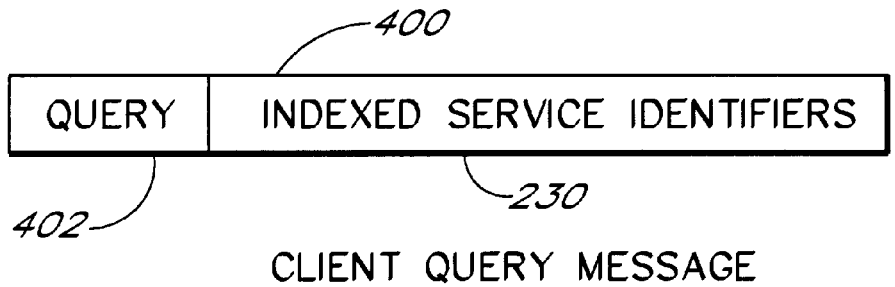
FIG. 4A illustrates the format of a client query message sent from the end-user station to the on-line network.

Once the end-user enters a search request, the find client 140a sends the search request to the find service module 140b. Preferably, the find client 140a creates a client query message 400 as illustrated in FIG. 4A. The client query message 400 contains the query 402 and the indexed service identifier 230 (the service identifier 230 that identifies an indexed service). The query 402, as explained in more detail below, includes the search terms. For example, the query 402 can include a desired name, topic, category or place.

In the current embodiment, the present invention searches the main content catalog in the DirSrv service 134. Thus, the service identifier 230 is set to the value 0x0001H to identify the DirSrv service 134. In other embodiments it is envisioned that the client query message 400 will contain other indexed service identifiers 230 which direct the present invention to locate content in other services such as the bulletin board service 132.

The find service module 140b (hereinafter referred to as the find service 140b) exists in the on-line network 100. The find service 140b receives the client query messages 400 and performs the administrative function of routing the client query messages 400 to the query service modules 302. In the preferred embodiment, the query service module 302 is called the connection server 302 and is hereinafter referred to as the connection server 302.

In a preferred embodiment, the find service 140b contains multiple servers 120 which are interconnected by the local area network 122, and are arranged into a find service group. Each server 120 of the find service group is preferably a "replicated" version of the other servers 120 within the find service 140b, meaning that each runs the same find service software as the others to implement a common find service 140b. The find service 140b can comprise as few as one server 120.

In addition, the find service 140b obtains the security tokens 220 assigned to the end-user from the security service 150. To obtain the security tokens 220 assigned to the end-user, the find service 140 sends the end-user's account information to the security service 150. The security service 150 accesses the security tokens 220 assigned to the end-user in its access rights database 152 and sends the security tokens 220 back to the find service 140b. A person of ordinary skill in the art will appreciate that the security service 150 may contain a number of different relational databases, tables and arrays which associate an end-user's account number with a list of security privileges without departing from the scope of the present invention. The find service 140b uses the security tokens 220 as additional search terms so as to locate only those offerings which the end-user has access rights to view.

Figure 4B:
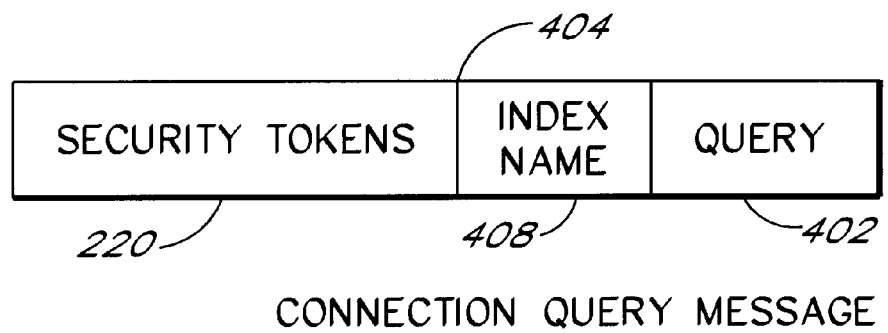
FIG. 4B illustrates the format of a connection query message sent from the find service to the query module in the preferred embodiment of the present invention.

Once the find service 140b obtains an end-user's assigned security tokens 220, the find service 140b creates a connection query message 404. As illustrated in FIG. 4B, the connection query message 404 contains the security tokens 220, the index name 408 and the query 402. The index name 408 specifies an index associated with a particular service. For example, the index name 404 might specify the index for DirSrv service 134. The query 402 contains the query 402 received from the client query message 400.

Figure 5:
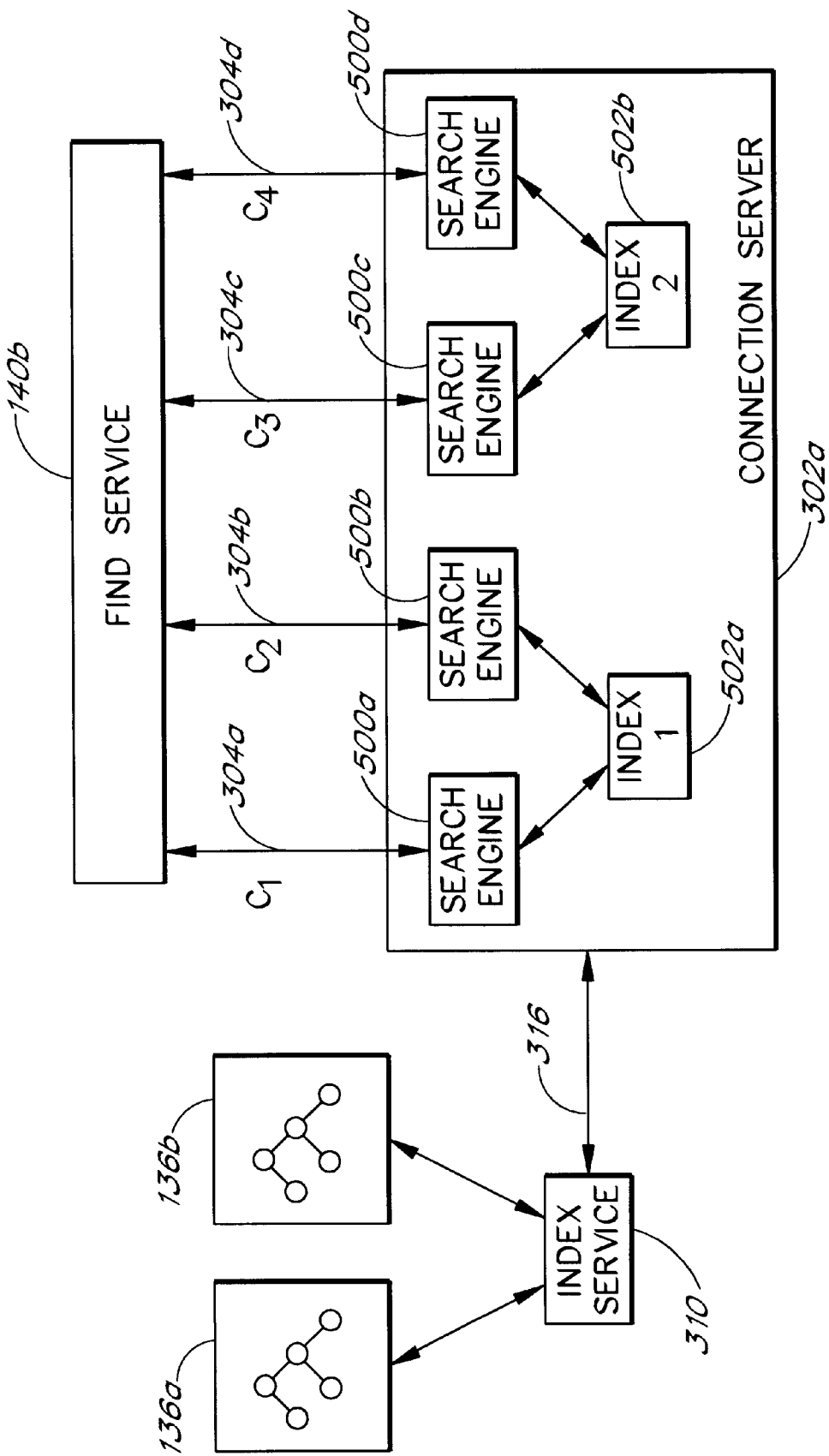
FIG. 5 is a detailed block diagram illustrating the architecture of a preferred embodiment of the present invention.

The find service 140b sends the connection query messages 404 to the connection servers 302. Referring to FIG. 5, each connection server 302 creates and maintains multiple connections 304 which link the find service 140b with the search engines 500. In addition, the connection servers 302 take advantage of recent advances in multitasking operating systems which allow each connection server 302 to execute multiple search engines 500 simultaneously.

The search engines 500 are executable programs designed to process the connection query messages 404. FIG. 5 shows one connection server 302a with four search engines 500a, 500b, 500c and 500d. The search engines 500a, 500b, 500c and 500d execute as separate execution threads in the connection server 302a. In the preferred embodiment, the search engines 500 are copies of a commercially available program called the Fulcrums® SearchServer™ developed by Fulcrum Technologies, Inc. of Canada. One of ordinary skill in the art, however, will appreciate that any of a variety of general purpose search engines can be used as the search engines 500.

Each connection server 302 contains search engines 500 that search copies of different indexes 502 or copies of a single index 502. For example, one search engine 500 might search the DirSrv index 502a, while another search engine 500 might search the bulletin board index 502b. In the preferred embodiment, each search engine 500 searches a particular index 502.

Figure 4C:
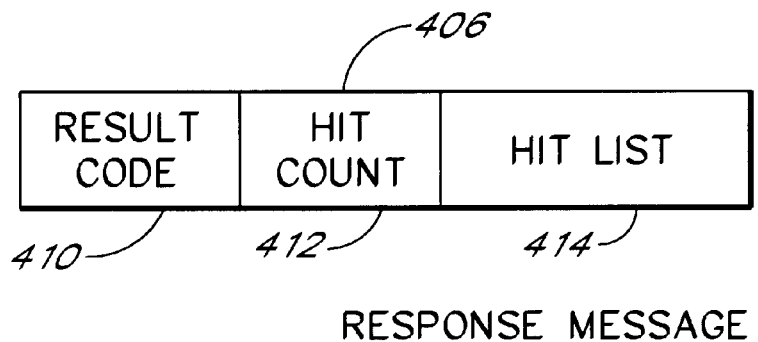
FIG. 4C illustrates the format of a response message sent from the query module to the find service and from the find service to the end-user station in a preferred embodiment of the present invention.

In FIG. 4, search engines 500a and 500b search index1 502a. In addition, search engines 500c and 500d search index2 502b. Each index 502 contains a list of search terms which are associated with the offerings existing in a service. In the preferred embodiment, the indexes 502 are created by a commercially available program called the Fulcrum® SearchServer™ developed by Fulcrum Technologies, Inc. of Canada. One of ordinary skill in the art, however, will appreciate that a variety of commercially available general purpose indexing programs can be used to create the indexes 502.

In the preferred embodiment, the indexes 502 are identified with names. In FIG. 5, index1 502a identifies a particular service index, index2 502b identifies another service index and so on. Each index 502 contains a list of search terms which are associated with particular offerings. In addition each index 502 contains the location of the offerings in the service namespace 136. For example, the DirSrv index associates search terms with the offerings in the DirSrv namespace 136b. In addition, the DirSrv index contains the location of the offerings in the DirSrv namespace 136b.

The find service 140b communicates with the search engines 500 via multiple connections 304. The example illustrated in FIG. 4 shows four connections 304a, 304b, 304c and 304d. A connection 304 is a communications link which directs a stream of data from one service to another service. In the preferred embodiment, the connections 304 are implemented as pipes, however, other implementations can use sockets or other communication links. A pipe is used to redirect data and is defined as a stream of data which can be shared among different execution threads and processes. A socket is a general purpose interprocess communication mechanism. Thus a socket, like a pipe, allows the find service 140b to communicate with the connection servers 302.

The implementation techniques associated with named pipes and sockets are well known in the art and described in Chapter 54 of *The Win 32 Programmer's Reference Vol. II*, Microsoft Press, 1993, pp. 266–301, which is hereby incorporated by reference.

In addition to establishing the connections 304, the connection servers 302 also establish connections 304 with external data sources 308. As explained in more detail below, the connection servers 302 link the find service 140b to the external data sources 308 via the connections 304. However, the connections 304 then communicate with the external data sources 308 by using the communications protocol required by the external data source 308. Thus, with the present invention, an end-user of the present invention can send search requests to external data sources 308 and obtain the location of offerings existing in the external data sources 308.

In order to route a connection query message 404 to the proper search engine 500, the find service 140b creates three tables—the connection server table, the service identifier table and the connection table. When creating the tables, the find service 140b of the preferred embodiment accesses a windows NT registry. As discussed in more detail below, during initialization, the network provider defines the indexed service identifiers 230 (the service identifiers 230 associated with the indexed services), the number of connections 304 and the names of the connection servers 302a. This information is then added to the Windows NT registry.

The Windows NT registry is a repository for all information about the computer hardware the operating system is running on and the software installed on the system. The Windows NT registry and the methods for modifying the Windows NT registry are well known in the art, and are described in *The Win 32 Programmer's Reference Vol. II*, Microsoft Press, 1993, pp. 203–239 which is hereby incorporated by reference. While the preferred embodiment of the present invention accesses the Windows NT registry, in other embodiments, the present invention can access the registries in other operating systems, access a wide variety of files which describe the hardware and software existing in the connection servers 302a or can dynamically update the find service 140b as the on-line network 100 is modified. For instance, other embodiments can dynamically modify the find service 140b when new modules are added to the on-line network.

The find service 140b accesses the Windows NT registry to retrieve hardware and system information. For example, the find service 140b accesses the Windows NT registries in the connection servers 302 to obtain the names of the connection servers 302 and to determine the indexes 502 stored in each connection server 302. After obtaining the system information from the Windows NT registry, the find service 140b creates the indexed services table 600, the connection server table 700 and the connection block table 800 illustrated in FIGS. 6, 7 and 8.

FIG. 6 illustrates the indexed services table 600. The indexed services table 600 associates the indexed service identifiers 230 with a list of connection servers 302 and a list of index names. The indexed services table 600 only contains the service identifiers for the indexed services. For example, if the offerings in the chat service 130 have not been indexed, the indexed services table 600 does not contain the indexed service identifier 230 for the chat service 140. Preferably, the indexed services table 600 contains three columns and a row for each indexed service.

The first column 602 contains the indexed service identifier 230 associated with a service. For example, in the preferred embodiment, the indexed service identifier 230 contains the value 0x0001H which corresponds to the DirSrv service 134. While the preferred embodiment uses the indexed service identifiers 230 existing in the on-line network, in other embodiments the find service 140b can define its own indexed service identifiers 230. Thus, the indexed service identifiers 230 in the find service 140b can range in size and format and can identify external data sources 308 which have not been assigned a service identifier 230 by the on-line network.

The second column 604 contains the list of connection servers 302. The list of connection servers 302 tabulates all the connection servers 302 which contain a copy of a particular index. For example, the DirSrv index (index1) 502a may exist on the first connection server 302a and the second connection server 302b. Accordingly, *the list of connection servers 604 states that the first connection server 302a and the second connection server 302b contain the Dirsrv index (index1) 502a.*

The third column 606 contains the name of the index 502. In this example, the name of the DirSrv index 502a is index1. Typically the index name is a string of characters which uniquely identifies each index 502. Thus, with the indexed service table 600, the find service 140*b* can use an indexed service identifier 230 to determine the name of the index 502 associated with the indexed service identifier 230 and the list of connection servers 302*a* containing a copy of the index 502.

FIG. 7 illustrates the connection server table 700 existing in the find service 140*b*. The connection server table 700 associates each connection server 302 with a list of indexed service identifiers 230 and a list of connections 304. Preferably, the connection server table 700 contains four columns and a row for each connection server 302. The first column 702 contains the name of a connection server 302. In the preferred embodiment, each connection server 302 is identified with a name. The second column 704 contains a list of the indexed service identifiers 230 associated with a particular connection server 302.

Figure 8:
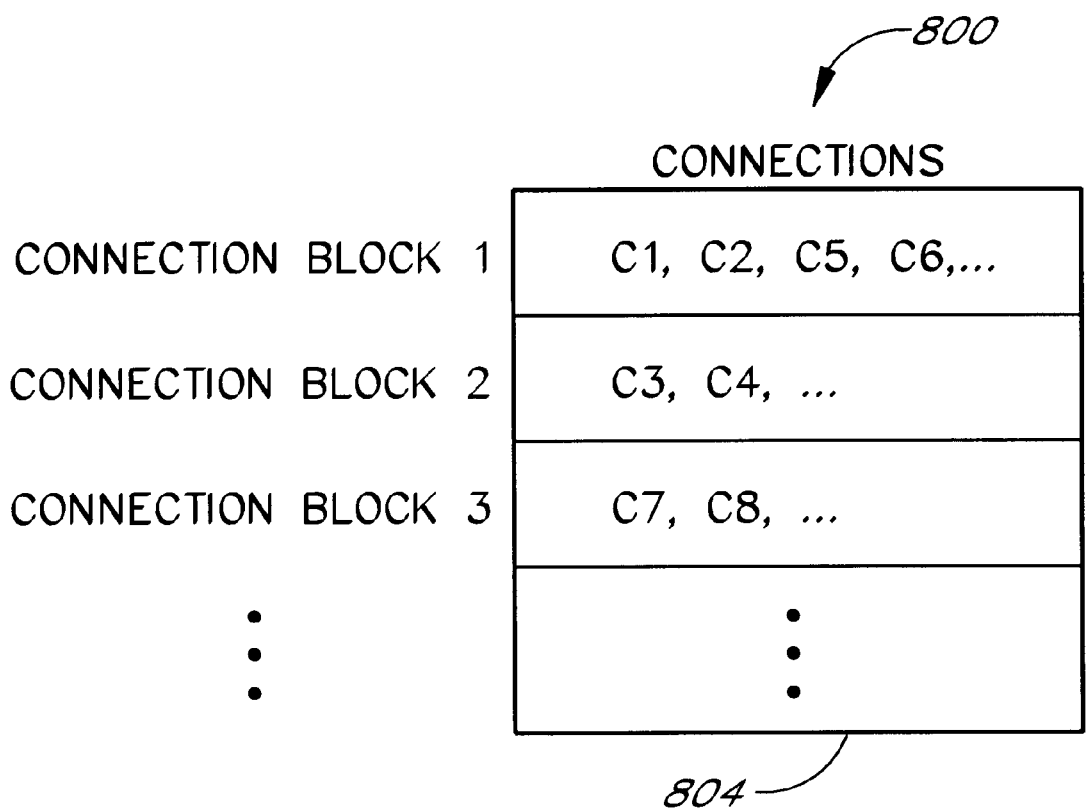
FIG. 8 illustrates a connection table created by a preferred embodiment of the present invention.

The third column 706 contains a list of connections 304 which specifies each connection 304 accessed by the find service 140*b*. For example, referring to FIG. 5, the list of connections would show that the C1 connection 304*a* links the find service 140*b* with the first search engine 500*a*. The fourth column 708 contains the number of connections 304 associated with each indexed service identifier 230. Therefore, the connection server table 700 allows the find service 140*b* to determine the indexed service identifiers 230, the list of connections 304 and the number of connections 304 associated with a particular connection server 302. FIG. 8 illustrates the connection block 800. The connection block 800 has multiple rows. Each row corresponds to an indexed service identifier 230 and contains a list of connections 304.

For example, referring to FIG. 5, the C1 connection 304*a* and the C2 connection 304*b* link the find service 140*b* with the search engines 502*a* and 502*b*. The search engines 500*a* and 500*b* search index1 502*a*. Accordingly, the indexed services table 600 contains the indexed service identifier 230, the list of connection servers, and the index name. The connection server table 700 contains the list of the connections 304 (C1 and C2) which search index1 and the number of connections 304 (thirty-two) associated with the connection server 502*a*. The connection block 800 contains a row that lists the connections 304 (C1, C2, etc.).

Figure 9:
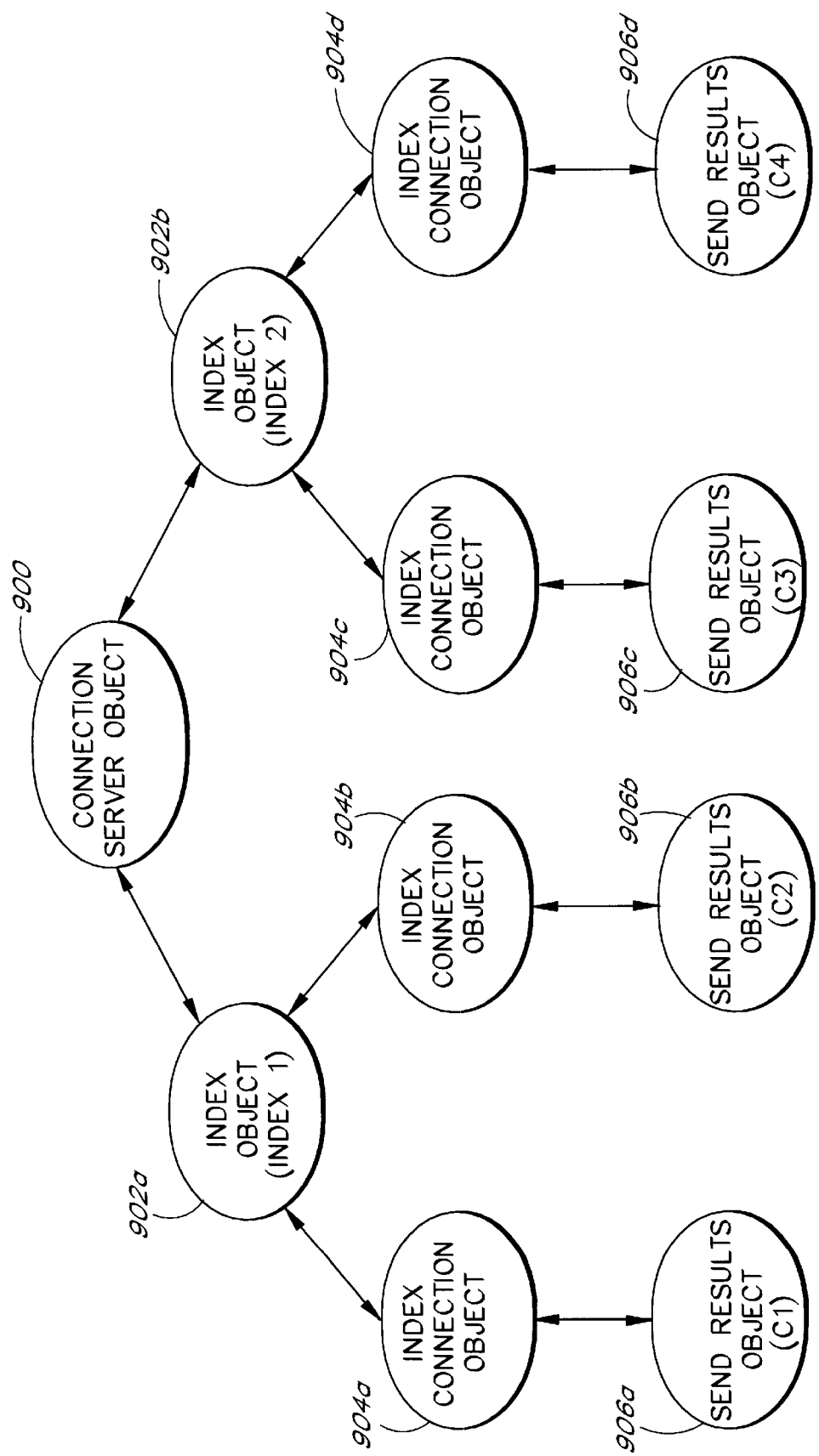
FIG. 9 illustrates an object-oriented data structure existing in the query module of the preferred embodiment of the present invention.

Referring now to FIG. 9, the data structure created by the connection server 302 is shown. The data structure exists in each connection server 302 and includes a connection server object 900, one or more index objects 902, one or more index connection objects 904 and one or more send results objects 906. While the following description describes the present invention in object-oriented terminology, a person of ordinary skill in the art will appreciate that other programming techniques can be used such as programming techniques which use defined structures, arrays, procedure calls and subroutines.

In the present invention, an object is a data structure which contains data and a set of accompanying methods (also called functions). A method is a routine which contains a set of programmed instructions which direct the computer hardware to perform a desired action. When an object is created it is said to be instantiated. The instantiation of an object includes the allocation of memory to hold the object and the creation of object interfaces which point to the methods implemented by the object.

An object interface groups the methods contained in an object. Typically, an object interface is a table which points to the methods within the object. The object interface allows other objects to "call" the methods existing within the object. A method "call" takes the form of a function call which specifies a particular interface and method name. The method call also passes data to the object containing the method. In addition, the methods which exist in an object are often called application programming interfaces or API's.

The objects in the present invention are instantiated with the Object Linking and Embedding CoCreateInstance method. The CoCreateInstance method is well known in the art, and is described in *OLE 2 Programmer's Reference Vol. I*, Microsoft Press, 1993, pp. 256 and in *OLE 2 Programmer's Reference Vol. II*, Microsoft Press, 1993, pp. 56–62, and Brockschmidt, Inside OLE 2, Microsoft Press, 1994, pp. 149–152. The CoCreateInstance method uses globally unique identifiers to locate the software instructions related to a particular object, load the software into memory and instantiate the requested object.

Figure 10:
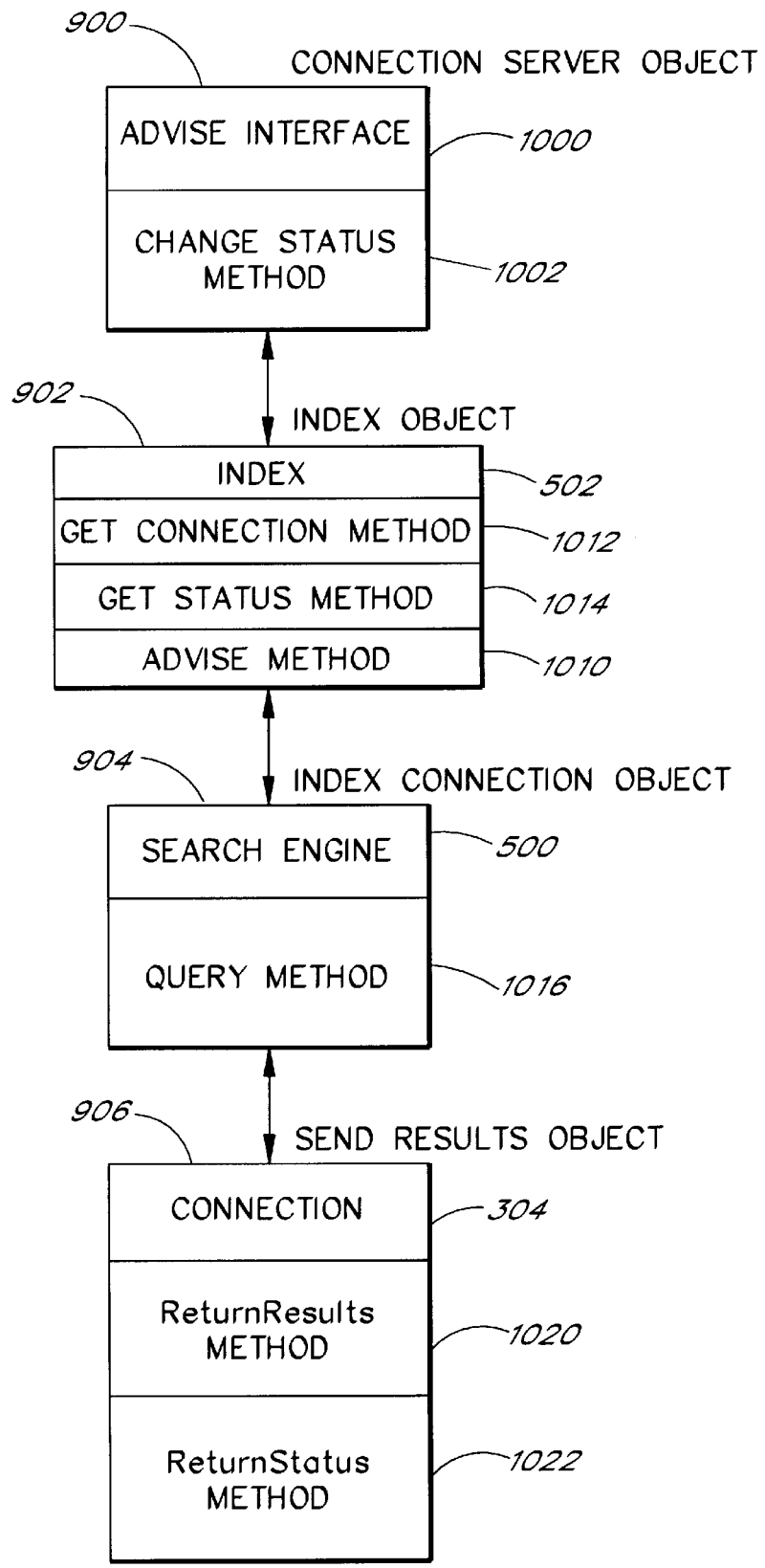
FIG. 10 illustrates a detailed object-oriented data structure existing in the query module of the preferred embodiment of the present invention.

Referring now to FIG. 10, a detailed block diagram of the connection server data structure is shown. During initialization, the connection server 302 instantiates the connection server object 900. The connection server object 900 establishes an advisory connection 304 which is used to advise the find service 140*b* about the status of the indexes 502. The connection server object 900 contains a ChangeStatus method 1002 which exists in an Advise interface 1000. The ChangeStatus method 1002 sends index status information to the find service 140*b*.

The CoCreateInstance method instantiates the index objects 902 when the connection server 302 is initialized. Each index object contains an index 502, an Advise method 1010, a GetConnection method 1012 and a GetStatus method 1014. The index objects 902 correspond to the indexes 502 in a particular connection server 302. For example, referring to the example in FIG. 5, the connection server 302 contains two indexes 502*a* and 502*b*. Accordingly, the connection server data structure contains two index objects 902*a* and 902*b*. The first index object 902*a* corresponds to index1 502*a* and the second index object 902*b* corresponds to index2 502*b*.

The connection server 302 passes the index object 900 a pointer to the Advise interface 1000 in the connection server object 900 with the Advise method 1010. Thus, the index object 902 can call the ChangeStatus method 1002 to advise the find service 140*b* of changes to the status of an index 502. As discussed in more detail below, changes may include (1) requesting an index 502 update and (2) requesting the resumption of searching after updating an index 502. The GetStatus method 1014 returns the current status of an index.

When the connection server 302*a* receives a request to establish a connection 304, the connection server 302*a* calls the GetConnection method 1012 to establish the requested connection 304. When called, the GetConnection method 1012 instantiates the index connection object 904. Each index connection object 904 contains a search engine 500 and a Query method 1016. Preferably, each index connection object 904 executes in a separate execution thread.

Thus each search engine instance 500 is represented by the index connection object 904. For example, FIG. 5 illustrates a connection server 302*a* which contains four search engines 500*a*, 500*b*, 500*c* and 500*d*. Accordingly, the connection server 302*a* data structure illustrated in FIG. 9 contains four index connection objects 904*a*, 904*b*, 904*c* and 904*d*. Index objects 904*a*, 904*b*, 904*c* and 904*d* correspond to search engines 500*a*, 500*b*, 500*c* and 500*d* respectively.

In the preferred embodiment, the index connection objects 904 contain the Fulcrum® SearchServer™ search engines. However, the unique architecture of the present invention allows the index connection objects 904a to implement a variety of search engines. If a different search engine is needed, the network provider can direct the GetConnection method 1012 to load the desired search engine when the GetConnection method 1012 instantiates the index connection object 904. In addition, each index connection object 904 points to the indexes 502 in the index objects 902. For example, search engine 500a searches index1 502a. Accordingly, index connection object 904a points to index1 in the index object 902a. Furthermore, in the preferred embodiment, each index connection object 904 is associated with a separate execution thread.

In addition to instantiating the index connection object 904a, the GetConnection method 1012 also instantiates the send results object 906 and sets a pointer in the index connection object 904 to reference the newly instantiated send results object 906. The send results object 906 contains the ReturnResult method 1020 and the ReturnStatus method 1022. As discussed in further detail below, the ReturnStatus method 1022 sends the results code 410 and the hit count 412 to the find client 140a. The ReturnResults method 1020 sends incremental portions of the hit list 414 to the find client 140a. The ReturnStatus method 1022 and the ReturnResults method 1020 send the results via the connection 304.

This object-oriented approach simplifies the implementation of the search engines 500 in the index connection object 904. Advantageously, the search engines 500 operate in separate execution threads. This allows multiple search engines 500 to execute simultaneously. Furthermore, this object-oriented approach allows the search engines 500 to call standard methods in the send results object 906 when sending results back to the find service 140b. As new connections 304 such as sockets are added, the standard methods are updated without having to rewrite the search engine software. Thus, the present invention creates a communication abstraction layer that allows a search engine 500 in the index connection object 904 to call standardized communication methods rather than implement the specific communication implementation details.

Other embodiments of the connection server 302 do not use object-oriented data structures. For example, one embodiment of the connection server 302 spawns a new process (called the FindCon process in the preferred embodiment) each time a connection 304 is requested by the find service 140b. The process contains a search engine 500, an index 502 and the software instructions for creating the connections 304. When the find service 140b requests a new connection 304, it passes the name of the desired connection 304. The process then opens the connection 304 and waits for the find service 140b to send connection queries 404.

After the search engines 500 processes a query, the search engines create a response message 406. Referring to FIG. 4, the response message 406 contains a result code 410 a hit count 412 and a hit list 414. The result code 410 indicates whether a non-fatal or fatal error has occurred. The hit count 412 contains the number of offerings located by the search engine 500. The hit list 414 contains a list of the offering identifiers 232 for each of the located offerings. While the preferred embodiment returns the hit list 414 of offering identifiers 232, the format and size of the offering identifiers 232 can be defined by the indexing software as discussed in further detail below.

In the preferred embodiment, the results code 410 and hit count 412 are returned immediately to the find client 140a while the hit list 414 is sent incrementally. In the object-oriented embodiment, the search engine 500 in the index connection object 904 calls the ReturnStatus method 1022 existing in the send results object 906 to send the results code 410 and the hit count 412 to the find client 140a. The ReturnStatus method 1022 uses network techniques known to one of ordinary skill in the art to send the results code 410 and the hit count 412 to the find client 140a.

The search engine 500 calls the ReturnResults method 1020 existing in the send results object 906 to send incremental portions of the hit list 414 to the find client 140a. When the search engine 500 begins locating the offering identifiers 232 in the index 502, the search engine 500 calls the ReturnResults method 1020 multiple times. Each time the search engine 500 calls the ReturnResults method 1020 an incremental portion of the offering identifiers located since the last ReturnResults method 1020 call are sent to the find client 140a. The ReturnResults method 1020 uses networking techniques known to one of ordinary skill in the art to send the incremental portions of the hit list 414 to the find client 140a.

Thus, the search engine 500 can begin sending the offering identifiers 232 in the hit list 414 to the find client 140a as the search engine 500 continues to process the search request. The find client 140a can then begin obtaining the list of properties 208 associated with the offering identifiers 232. This greatly improves performance since the end-user can begin viewing the located offerings while the search engine 500 is still processing the search request. Furthermore, if the end-user sees that he has entered an undesired search request, the end-user can cancel the search request before the processing of the search request is completed. This saves on-line network processing time, reduces network communication traffic and improves end-user satisfaction.

B. Entering A Search Request

Figure 11:
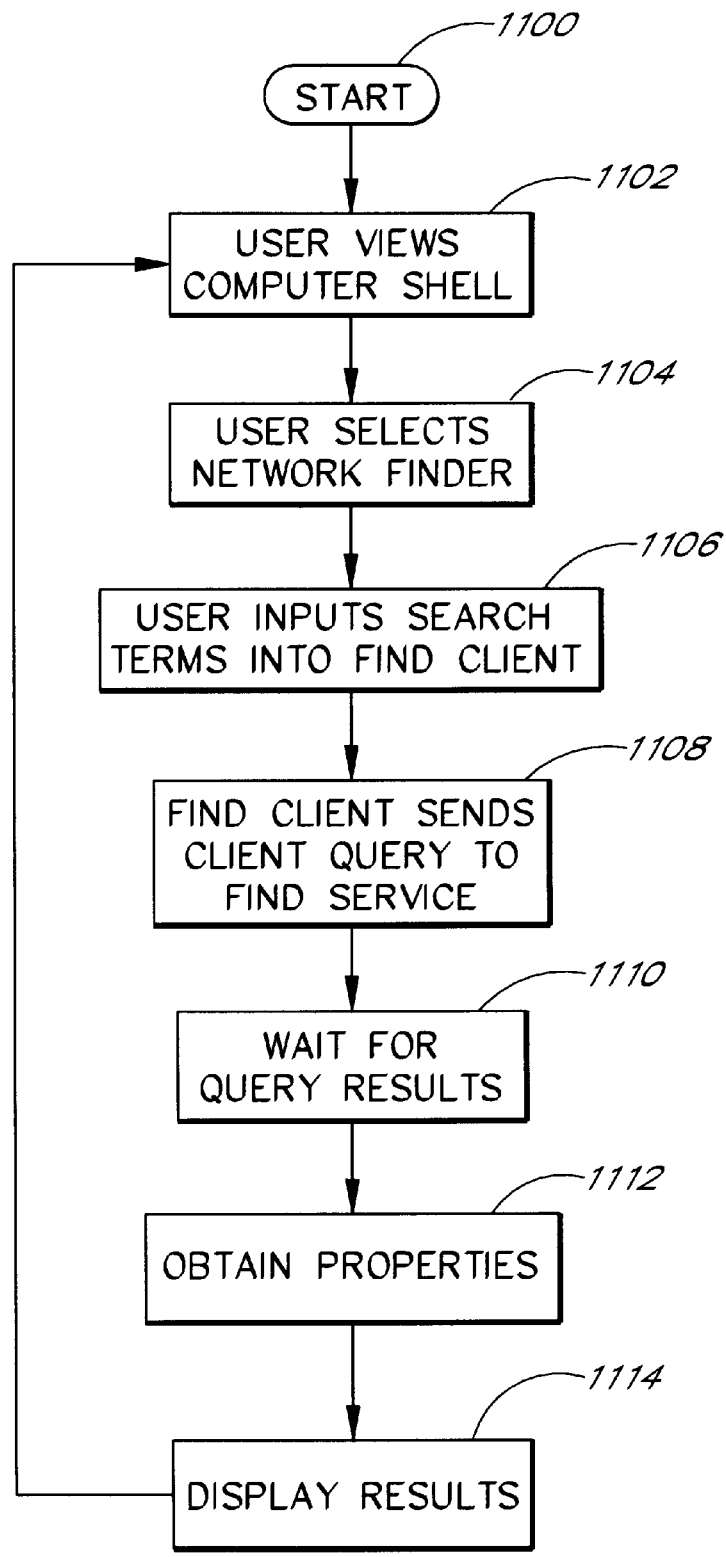
FIG. 11 is a flow chart illustrating the execution states in the client portion in one presently preferred embodiment of the present invention.

FIG. 11 illustrates a flow chart of the sequence of states executed by the find client 140a. Upon activation of the end-user station 102, in start state 1100, the end-user station 102 loads the operating system and displays the operating system user interface or computer shell 300. In the preferred embodiment, the end-user views the Windows 95 user interface. Proceeding to state 1102, the computer shell 300 displays a user interface on the end-user station 102 and processes input commands entered by the end-user. Proceeding to state 1104, an end-user can select the find client 140a by selecting a menu option, selecting an icon, inputting keyboard commands and the like. In response, the computer shell 300 locates the executable program that contains the find client 140a and invokes the find client 140a.

Figure 12:
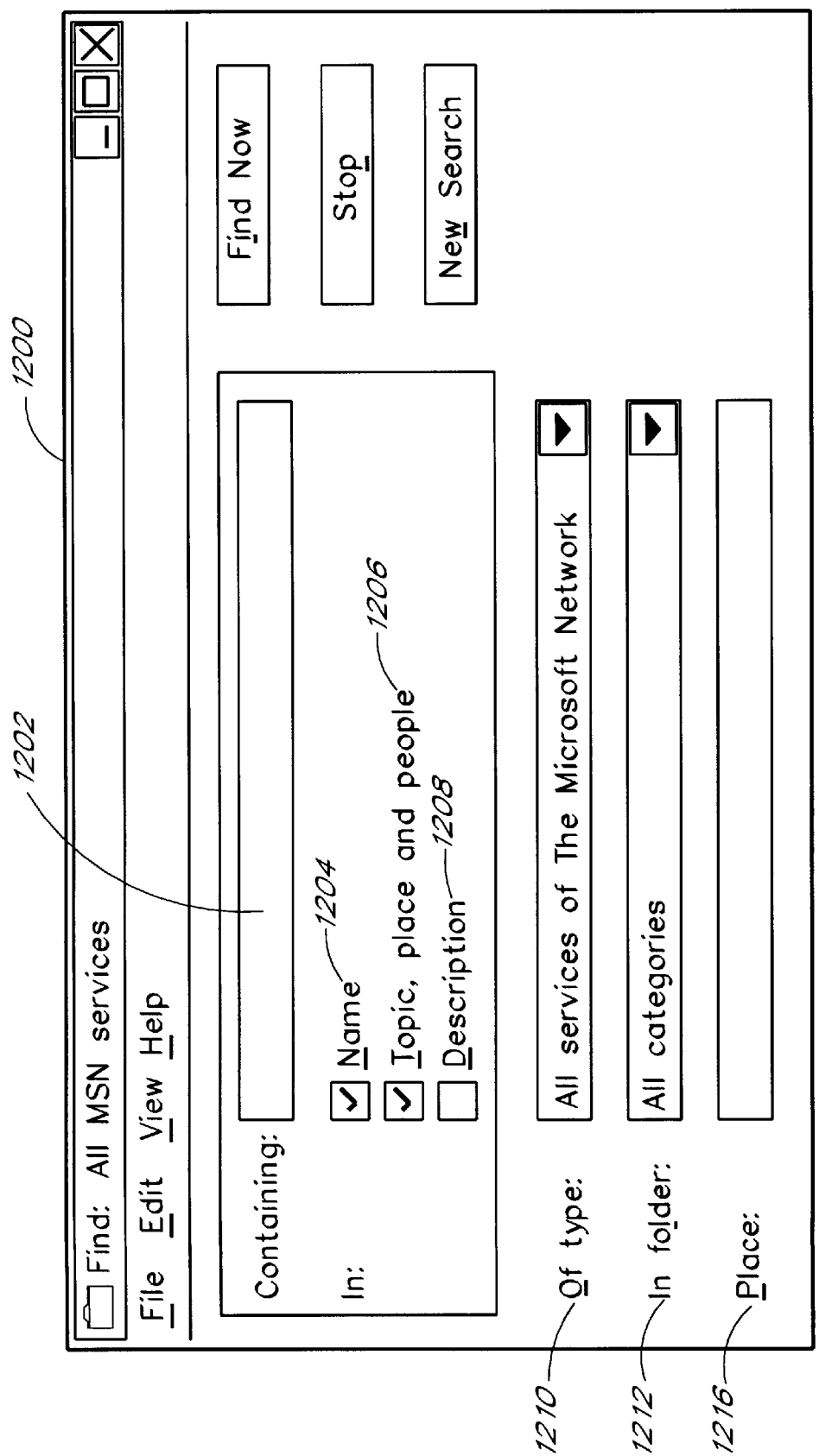
FIG. 12 illustrates a preferred dialog box displayed by the present invention.
Figure 13:
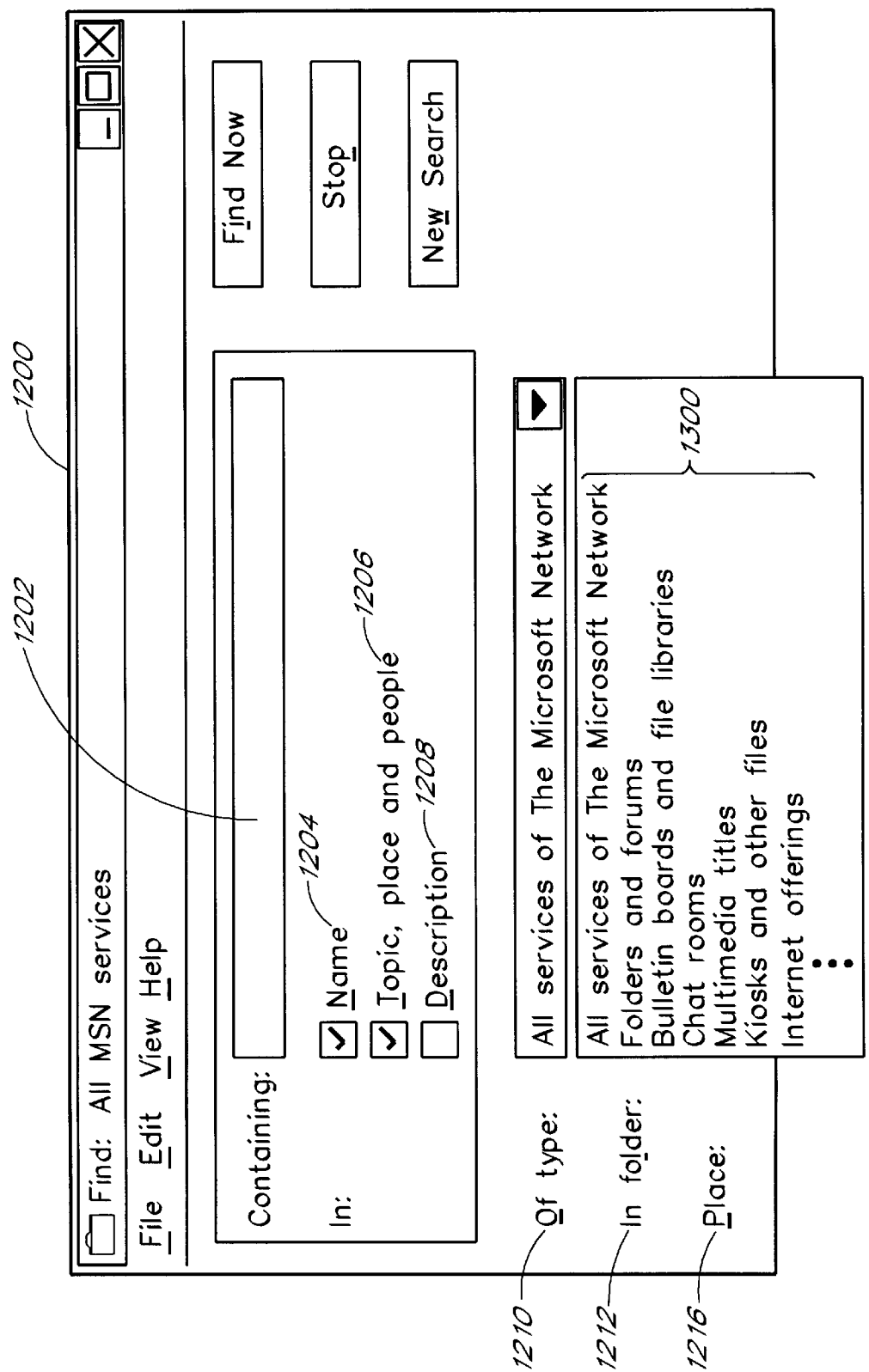
FIG. 13 illustrates the different category types displayed by a preferred dialog box in the present invention.

Proceeding to state 1106, the find client 140a directs the computer shell 300 to display a user interface for inputting search requests and displaying search results. Referring to FIG. 12, the find client 140a directs the computer shell 300 to create the find dialog box 1200. The find dialog box 1200 is a special window displayed by the computer shell 300 to solicit a response from the end-user. The techniques for creating dialog box windows are well known to a person of ordinary skill in the art and can be found in the chapter on dialog boxes described in *The Win* 32 *Programmer's Reference Vol. I*, Microsoft Press, 1993 which is hereby incorporated by reference.

The dialog box window 1200 contains controls for inputting search terms, selecting options, etc. The end-user inputs a search request by entering search terms into the "Containing" control 1202. In addition, the end-user can select the "Name" control 1204, the "Topic" control 1206 the "Description" control 1208, the "Of Type" control 1210 and the "Place" control 1216.

If the end-user selects the name control 404 (a check mark appears in the name control 404) the search requests directs a search engine 500 to search the name property 210 of the nodes 202 in the on-line network 100. Likewise if the end-user selects the topic control 406 or the description control 408, the search request directs the search engine 500 to search the category property 224 or description property 218 of the nodes 202 in the on-line network 100.

The dialog box 1200 in the preferred embodiment also includes a number of drop down menus (menus that expand when selected). As illustrated in FIG. 5, the Of Type drop down 1210 includes: all offerings in the on-line network 100, folders and forums, bulletin boards, chat rooms, multimedia tiles, kiosks, internet offerings, etc. The Of Type drop down 1210 expands as new offerings are added to the on-line network 100. The In Folder control 1212 lists different content categories in the on-line network 100 and the Place control 1216 allows an end-user to specify a particular geographic region defined by the place property 238.

For example, the end-user can input a search request by entering search terms into the Containing control 402. The search terms can include, for example, the name of an offering, the type of an offering, a desired topic and the like. In the Containing control 402, the end-user can enter words, phrases and boolean operators (such as "and" or "or"). Thus the end-user can enter a search request such as "mortgage and banks."

Proceeding to state 1108 as shown in FIG. 11, the find client 140a sends the client query 400 to the find service 140b. The format of the client query 400 is shown in FIG. 4 and includes the query 402 and the service identifier 230. The query 402 contains the search terms and control options. The indexed service identifier 230 identifies different indexed services. In the preferred embodiment, the find client 140a sets the indexed service identifier 230 to specify the DirSrv service 134. In the future, however, it is envisioned that the find client 140a will specify other indexed service identifiers 230 based on the type of service the end-user has selected.

Proceeding to state 1110, the find client 140a waits for results from the find service 140b. Once the find client 140b begins receiving the query results, the find client 140a proceeds to state 1112 and checks the security of each located node 202.

Figure 14:
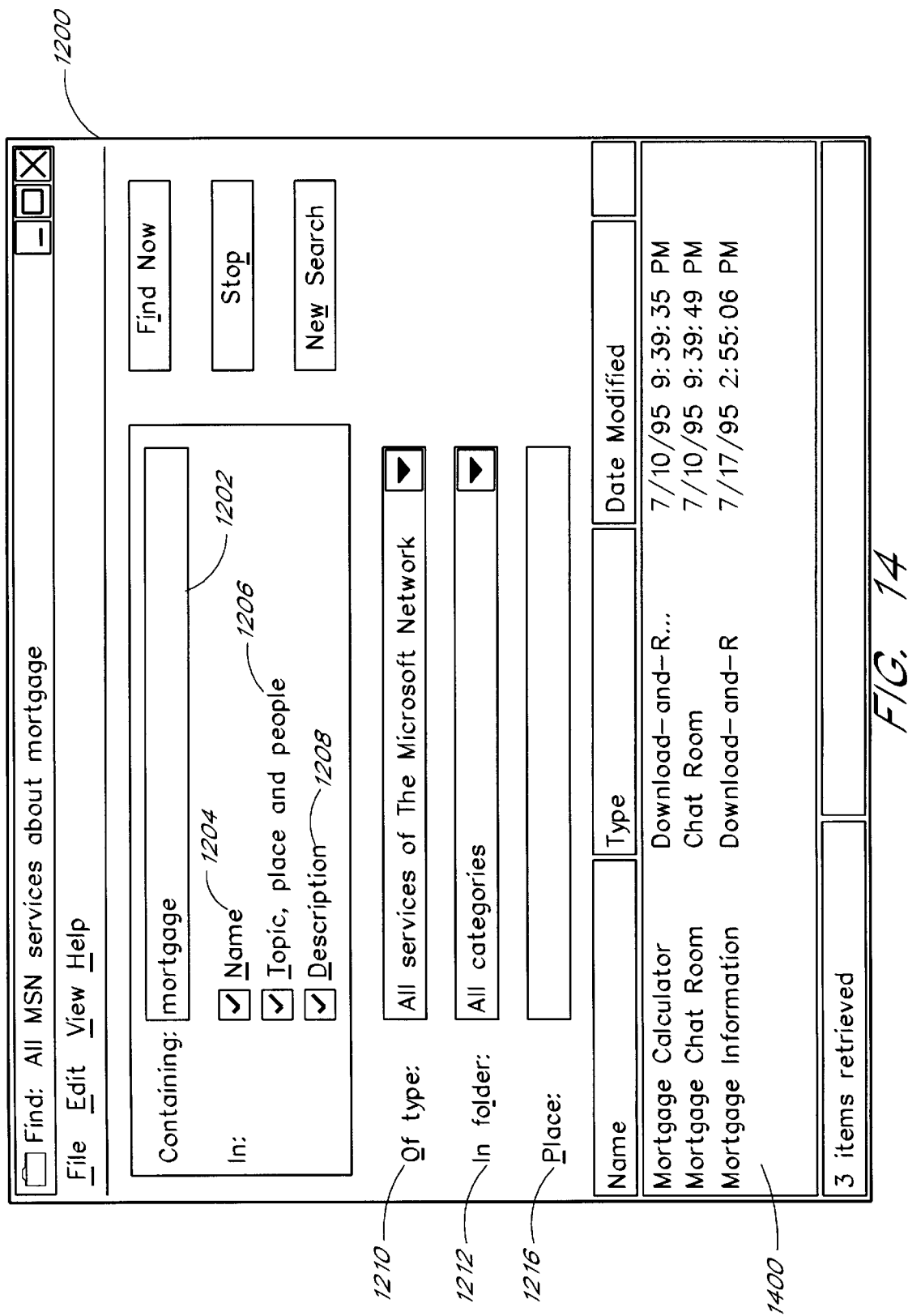
FIG. 14 illustrates the search results displayed by a preferred dialog box in the present invention.

The section entitled Validating Security Clearances describes the security validation process if further detail below. Proceeding to state 1114, the find client 140a displays those nodes 202 with the proper security clearances. As illustrated in FIG. 14, the results of the search request are displayed in a result pane 1400. For example, the results of the mortgage query returned the mortgage chat room node 202e and the mortgage rate information node 202f.

C. Processing A Search Request

Figure 15:
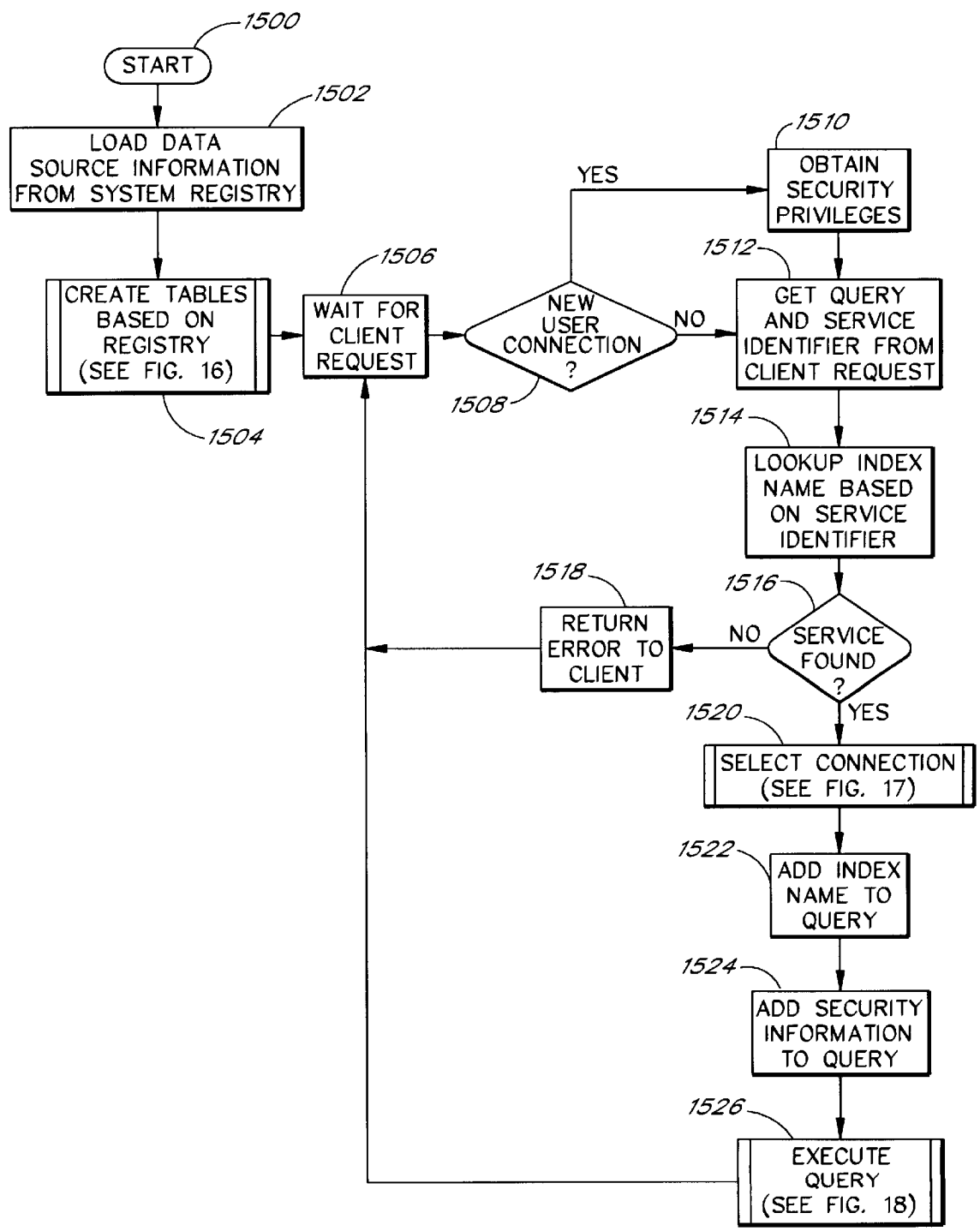
FIG. 15 is a flow chart illustrating the execution states in the on-line network portion of the present invention.

Focusing now on the operation of the find service 140b, the flow chart in FIG. 15 illustrates the execution states of the find service 140b. Beginning in a start state 1500, the find service 140b proceeds to state 1502 and loads the connection server 302 information from the system registry. In the preferred embodiment, the find service 140b accesses the Windows NT registry. From the Windows NT registry, the find service 140b obtains the names of the connection servers 302 and the names of the service indexes stored on the search engines 500. After obtaining the system information from the Windows NT registry, the find service 140b proceeds to state 1504.

Figure 16:
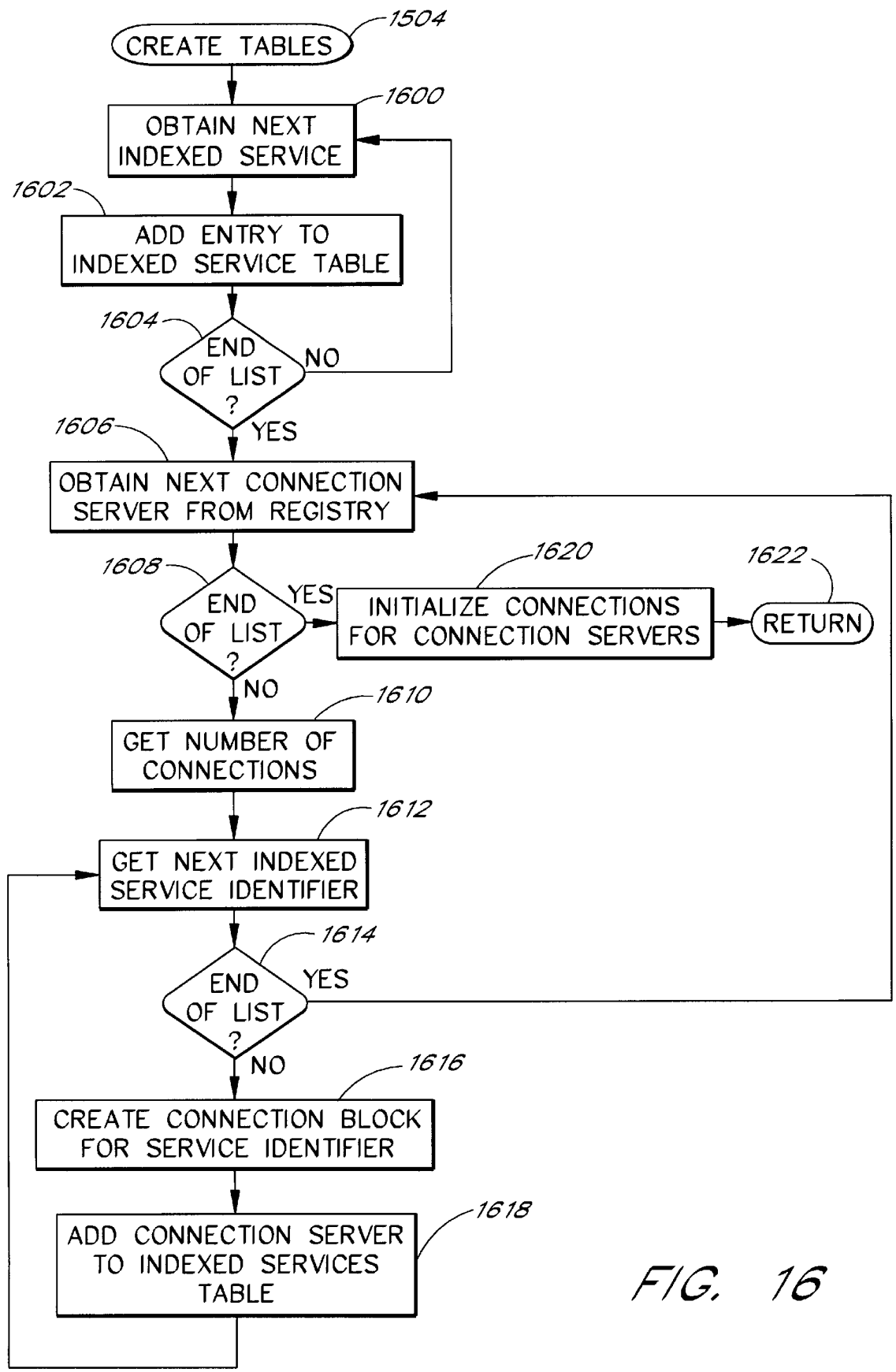
FIG. 16 is a flow chart illustrating a routine for generating the tables in the preferred embodiment of the present invention.

In state 1504, the find service 140b creates the indexed services table 600, the connection server table 700 and the connection block 800. The routine for creating the tables is shown in FIG. 16. Proceeding to state 1600, the find service 140b obtains the indexed service identifier 230 for the next indexed service from the system registry. Proceeding to state 1602, the find service 140b adds the indexed service identifier 230 to the first column 602 in the indexed service table 600. When adding the first indexed service identifier 230, the find service 140b creates the indexed services table 600. For example, the first time the find service 140b obtains the indexed DirSrv service identifier 230, the find service 140b creates the indexed services table 600 and adds the indexed DirSrv service identifier 230 to a row in the indexed services table 600.

Proceeding to state 1604, the find service 140b determines whether it has reached the end of the indexed service identifiers 230 stored in the system registry. If not, the find service 140b returns to state 1600 and adds the next indexed service identifier 230 to the indexed service table 600. If the find service 140b has added all of the indexed service identifiers 230 to the indexed service table 600, the find service 140b proceeds to state 1606.

In state 1606, the find service 140b obtains the name of a connection server 302 from the system registry. While in state 1606, the find service 140b adds the connection server name to the first column 702 of the connection server table 700. Proceeding to state 1608, the find service 140b determines whether it has obtained all the connection server names from the system registry. If so, the find service 140b proceeds to state 1620 and initializes the connections 304 for each connection server 302.

If the find service 140b has not obtained all of the connection server names, the find service 140b proceeds to state 1610 and gets the number of connections for each connection server 302. The find service 140b obtains the number of connections from the system registry and adds the number of connections to the fourth column 708 in the connection server table 700.

Proceeding to state 1612, the find service 140b obtains one of the indexed service identifiers 230 assigned to the connection server 302 from the system registry. For example, each connection server 302 may contain more than one index 502. Thus, there may be more than one indexed service identifier 230 associated with each connection server 302. After obtaining the indexed service identifier 230, the find service 140b adds the indexed service identifier 230 to the second column 704 of the connection server table 700 and proceeds to state 1614.

If, in state 1614, the find service has obtained all of the indexed service identifiers 230 associated with this connection server 302, the find service 140b returns to state 1606 and obtains the next connection server 302 from the system registry. However, if in state 1614, the find service 140b has not obtained all the indexed service identifiers 230 for this connection server 302, the find service 140b proceeds to state 1616.

In state 1616, the find service 302 adds the name of the connections 304 associated with the indexed service identifier 230 to the connection block 800 and the connection server table 700. In the case of the first indexed service identifier 140b assigned to the connection server 302, the find service 140b creates the connection block 800. Proceeding to state 1618, the find service adds the name of the connection server 302 and the name of the index 500 to the second column of the indexed services table 600. The find service 140b then proceeds back to state 1612 and gets the next indexed service identifier 230 assigned to the connection server 302.

Returning to state 1606, after building the tables, the find service 140b reaches the end of the connection server list in the system registry. In state 1608, the find service 140*b* then proceeds to state 1620 and directs the connection server 302 to establish the connections 304. In the preferred embodiment, each connection server 302 is limited to thirty-two connections 304; however, a wide range of connections 304 is acceptable.

To establish a connection 304, the find service 140*b* in the object-oriented embodiment, calls the GetConnection method 1012 existing in the index object 902. As explained above, the connection server object 900 and the index objects 902 are instantiated when the connection servers 302 are initialized. When called, the GetConnection method 1012 instantiates the index connection object 904. The instantiation of the index connection object 904 launches a search engine 500 in a separate execution thread.

In the preferred embodiment, the instantiated index connection object 904 executes the Fulcrum® SearchServer™ search engine software. However, the unique architecture of the present invention allows the index connection objects 904*a* to implement a variety of search engines. In addition to instantiating the index connection object 904*a*, the GetConnection method 1012 also instantiates the send results object 906 and sets a pointer in the index connection object 904 to reference the newly instantiated send results object 906. The send results object 906 establishes the connection 304 which links the find service 140*b* with the search engine 500.

While in state 1620, other embodiments of the connection server 302 spawn a new search engine process called a FindCon process. The FindCon process contains the Fulcrum® SearchServer™ search engine software, an index 502 and the software instructions for creating the connections 304. The FindCon process opens the connection 304 and waits for the find service 140*b* to send connection query messages 404. After establishing the connections 304, the find service proceeds to return state 1622 and returns back to state 1504 in FIG. 15.

Referring now to FIG. 15, after creating the tables, the find service 140*b* proceeds to state 1506 and waits for a client query message 400. Once the find service 140*b* receives a client query message 400, it proceeds to state 1508. In state 1508, the find service 140*b* determines whether a new end-user sent the client query message 400.

When an end-user first sends a client query 400 to the find service 140*b*, the network layers 314*a* and 314*b* establishes a client-to-service connection. The client-to-service connection indicates that the end-user is sending his first client query 400. In the preferred embodiment, the first time an end-user sends a client query message 404 to the find service 140*b*, the find service 140*b* proceeds to state 1510 and obtains the security tokens 220 for the new end-user.

The find service 140*b* stores the security tokens 220 for the end-user in a security token cache. The security token cache exists in the find service 140*b* memory. When end-users close the find dialog box 1200, a close connection messages is sent to the find service 140*b*. In response, the find service 140*b* deletes the security information related to the end-user from the security token cache.

After obtaining the end-user's assigned security tokens 220, the find service 140*b* proceeds to state 1512. If the end-user is sending another client query message 400 during the same logon session, the find service 140*b* proceeds directly from state 1508 to state 1512. In state 1512, the find service 140*b* begins creating the connection query message 404. To create the connection query 404, the find service 140*b* uses the indexed service identifier 230 in the client query 400 to access the indexed services table 600.

Proceeding to state 1516, the find service 140*b* determines whether the indexed service identifier 230 exists in the indexed services table 600. If not, the find service 140*b* proceeds to state 1518 and sends an error message to the client. For example, if the find client 140*a* requests the find service 140*b* to search the content of a service that has not been indexed, the specified index service identifier 230 does not exist in the indexed service table 600. However, if the indexed service identifier 230 exists in the indexed service table 600, the find service 140*b* obtains the name of the index 502 associated with the indexed service identifier 230.

D. Tuning Processing Loads While Routing The Search Requests

Proceeding to state 1520, the find service 140*b* executes the select connection routine. In the select connection routine, the find service 140*b* "tunes" the processing loads placed on the search engines 500. The find service 140*b* tunes the loads by selectively routing the connection query messages 404 to particular search engines 500. In the preferred embodiment, the find service 140*b* tunes the loads by employing a round robin technique when selecting one of the connections 304. In other embodiments, the find service 140*b* tunes the loads with dynamic load balancing which monitors the processor load on each connection server when selecting the connections 304. In addition, other embodiments can dynamically update the connections 304 assigned to the connection servers 302 so as to vary the number of connections associated with each connection server 302.

Figure 17:
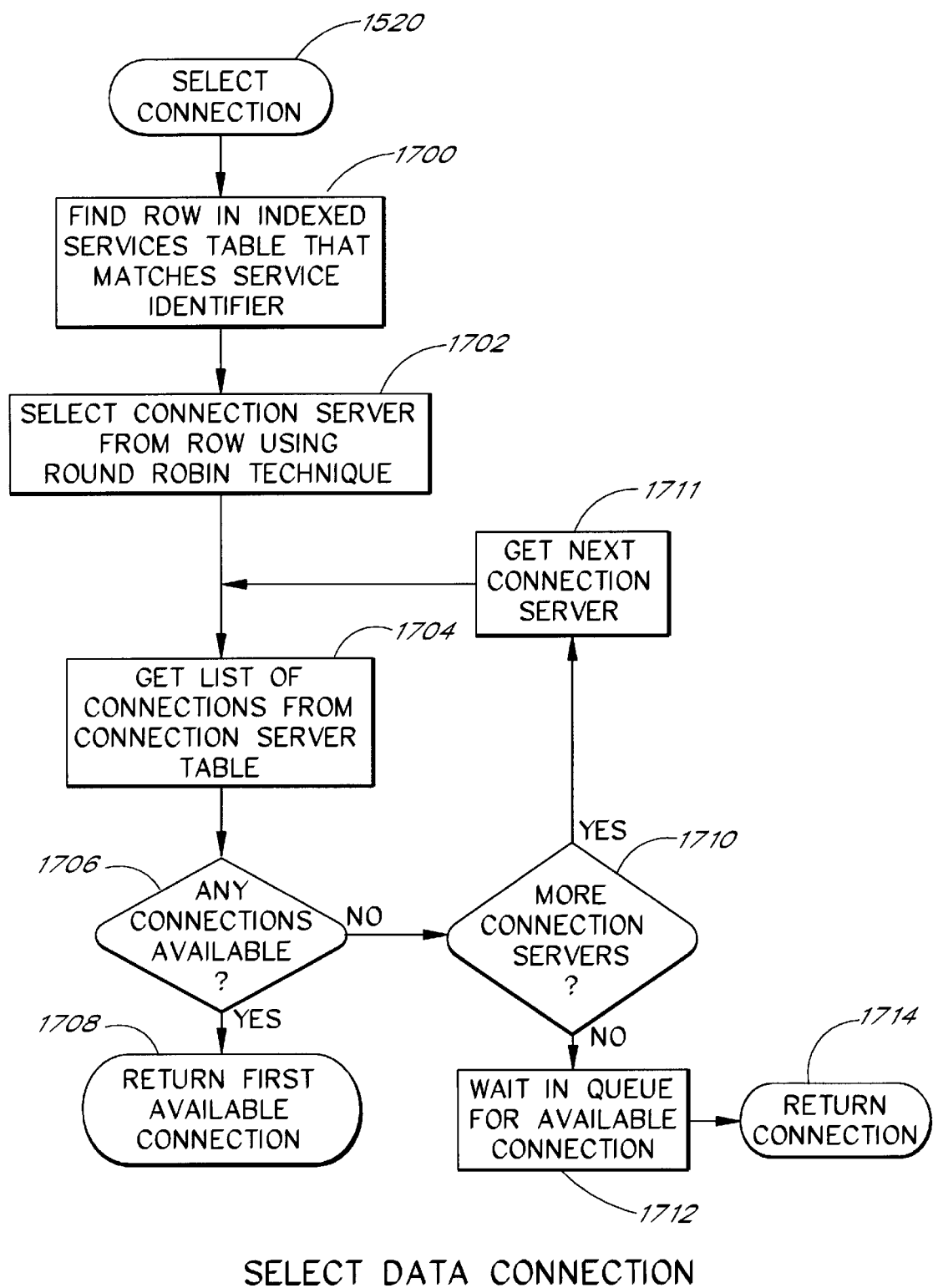
FIG. 17 is a flow chart illustrating a routine which selects a query connection in one presently preferred embodiment of the present invention.

A detailed flow chart of the select connection routine is shown in FIG. 17. Beginning in a start state 1520, the find service 140*b* proceeds to state 1700. In state 1700, the find service 140*b* uses the indexed service identifier 230 to obtain the list of connection servers 302 associated with the indexed service identifier 230. The list of connection servers 302 sequentially list each connection server 302 that is capable of processing a connection query message 404 associated with a particular service.

Proceeding to state 1702, the find service 140*b* in the preferred embodiment employs a round robin technique to select one of the connection servers 302. To balance the processing load placed on different connection servers 302, the round robin technique records the last connection server 302 which received a connection query message 404. When routing a subsequent connection query message 404, the find service 140*b* sends the subsequent connection query message 404 to the next connection server 302 in the list of connection servers 302.

For example, if the find service 140*b* sends a first connection query message 404 to the first connection server 302*a*, the find service 140*b* will attempt to send a second connection query message 404 to the second connection server 302*b*. When the find service 140*b* reaches the end of the connection server list, the find service 140*b* returns to the first connection server 302 in the list.

After selecting the next connection server 302, the find service 140*b* proceeds to state 1704. In state 1704, the find service 140*b* determines which connections 304 are assigned to the connection server 302 by accessing the connection server table 700. Using the name of the selected connection server 302 and the indexed service identifier 230, the find service 140*b* obtains the list of connections 304. While in state 1706, the find service 140*b* determines if any of the connections 304 in the selected connection server 302 are available.

If a connection 304 is available, the find service 140*b* proceeds to return state 1708. If a connection 304 is not available, the find service 140*b* proceeds to state 1710 and determines whether other connection servers are available. If so, the find service 140b proceeds to state 1711, selects the available connection server 302 and proceeds back to state 1704 where the find service gets the list of connections 304 for the available connection server 302.

For example, suppose three connection servers 302a, 302b and 302c contain index 1. Assume further that each connection server 302 contains thirty-two connections 304 for a total of 96 connections 304 (32×3=96). To balance the load on the connection servers 302a, 302b and 302c, the find service 140b uses the round robin technique to select a connection 304 in the first connection server 302 for the first query, a connection 304 in the second connection server 302 for the second query and so on. If all the connections 304 in the first connection server 302a are unavailable, the find service 140b selects the next available connection server 302 in state 1710 and proceeds to state 1704 to get the list of connections 304 in the available connection server 302.

Returning to state 1710, if none of the connection servers 302 are available (all of the connection servers 302 are currently processing a connection query 404), the find service proceeds to state 1712. In state 1712, the find service 140b places the query in a query queue. Once a connection 304 is free to take another query (the connection 304 completes execution of a previous query), the find service 140b proceeds to return state 1714.

Thus, the find service 140b maximizes the performance of the search engines 500 by balancing the loads placed on the connection servers 302. This unique round robin self-tuning approach tunes the processing loads by selectively directing the queries to different connection servers 302.

While the preferred embodiment uses the round robin technique described above, other embodiments of the find service 140b can tune the loads on the connection servers 302 by monitoring the activity rates of the connection servers 302 so as to dynamically load balance the routing of the connection query messages 404 to less active connection servers. In addition, other embodiments can dynamically update the list of connections assigned to the connection servers 302 so as to reduce the number of connections 304 or increase the number of connections 304 based on the processing loads of each connection server 302.

After obtaining an available connection 304, the find service 140 proceeds to return state 1708. Return state 1708 returns back to execution state 1520 in FIG. 15. The find service 140b then proceeds to state 1522 and begins to build the connection query message 404. While in state 1522, the find service 140b adds the query 402 from the client query message 400 and the index name 408 to the connection query message 404.

Proceeding to state 1524, the find service 140b obtains all the security tokens assigned to the end-user from the security cache. While in state 1524, the find service 140b adds the security tokens 220 to the connection query message 404.

E. Execution Of A Search Request

After creating a connection query message 404, the find service 140b proceeds to state 1526 where it directs the search engine 500 to process the connection query message 404. In state 1526, the find service 140b sends the connection query message 404 to the search engine 500, monitors the processing of connection query message 404, and sends the results back to the find client 140a.

Figure 18:
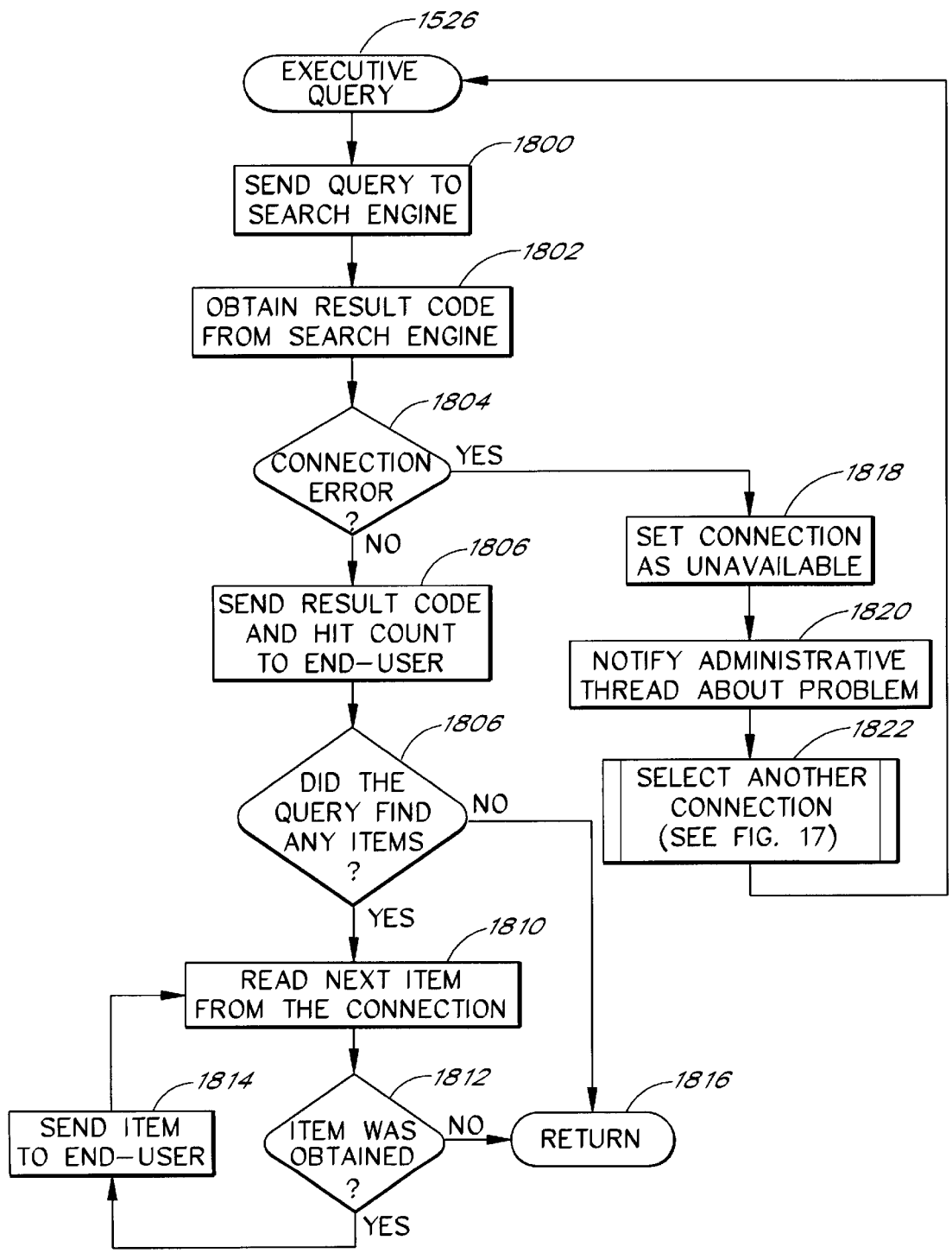
FIG. 18 is a flow chart illustrating a routine which executes a search query in one presently preferred embodiment of the present invention.

FIG. 18 illustrates a detailed flow chart of the execute query routine in state 1526. Beginning in start state 1526, the find service 140b proceeds to state 1800 where it sends the connection query message 404 to the search engine in the selected connection 304. While in state 1800, the connection server receives the connection query message 404.

In the object-oriented embodiment, the GetConnection method 1012 is called when the connection server 302 is initialized. As explained above, the GetConnection method 1012 instantiates the index connection object 904. The instantiation of the index connection object 904 launches a search engine 500 in a separate execution thread. After instantiation of the index connection object 904, a ProcessQuery routine is invoked. The ProcessQuery routine instantiates the send results object 906 and then waits for a connection query message 404.

When the ProcessQuery routine receives the connection query message 404, the ProcessQuery routine calls the Query method 1016 and passes a pointer to the send results object 906. The Query method 1016 then directs the search engine 500 to process the client query message 404 and return results back to the find service 140b via the send results object 906. In another embodiment, the selected connection 304 contains the software for communicating directly with the find service 140b.

The search engine 500 in the connection 304 processes the connection query message 404. The search engine 500 uses the security tokens 220, index name 408 and query 402 as search terms. The search engine 500 then locates the offerings which match the search terms. As explained above, in the preferred embodiment, the search engine 500 is the Fulcrum® SearchServer™ search engine 500 which communicates with the find service 140b via the connections 304. A person of ordinary skill in the art, however, will realize that a wide variety of search engines 500 can process the connection query message 404.

After processing the search terms, the search engine 500 creates a response message 406 as shown in FIG. 4. The response message contains a result code 410, a hit count 412 and a hit list 414. The result code 410 indicates if non-fatal and fatal errors has occurred. The result code 410 contains values that are defined to indicate errors have occurred. The hit count 412 contains the number of offerings located by the search engine 500. The hit list 414 contains a list of the offering identifiers 232 for each of the located offerings.

Proceeding to state 1802, the find service 140b obtains the results message 404 from the search engine 500. Initially, the results message 404 returns the result code 410 and the hit count 412 to the find client 140a. The hit list 412 is sent incrementally. Thus, while in state 1802, the search engine 500 begins sending the offering identifiers 232 in the hit list 412, as the search engine 500 continues to process the client query message 400.

Therefore, the search engine 500 does not need to wait until all of the offering identifiers 232 have been combined into the hit list 412 before sending the results message 404. This incremental implementation allows the find client 140a to begin obtaining the list of properties 208 associated with the offering identifiers 232, before the search engine 500 has completed processing the search request.

Furthermore, if the end-user determines that he has entered an undesired search request, the end-user can cancel the search request before the processing of the search request is completed. To cancel a request, the find client sends a cancellation client query message 404 to the find service 140b. In response, the find service 140b passes the cancellation client query message 404 to the index connection object 904 via the send results object 906. The index connection object 904 then cancels the processing of the search request and returns a cancel status code. In the preferred embodiment, the cancel status code is a predefined 32-bit offering identifier 232. Advantageously, the ability to cancel the currently pending search requests saves on-line network processing time, improves search request processing, reduces the processing loads placed on the search engines 500 and reduces network communication traffic.

Proceeding to state 1804, the find service 140*b* evaluates the result code 410 and determines whether an error has occurred. In the preferred embodiment, the results code 410 identifies whether fatal or non-fatal errors have occurred. A fatal error indicates that the search engine 500 isn't operating correctly. For example, a fatal error occurs when the search engine improperly processes the connection query message 404. A non-fatal error occurs when the search engine 500 is operating correctly, but receives, for example an improperly formatted connection query message 404.

If a fatal error occurs, the find service 140*b* proceeds to state 1818 and sets the connection 304 as unavailable. Proceeding to state 1820, the find service 140*b* notifies an administrative execution thread that an error has occurred. The administrative execution thread is a separate thread of execution in the find service 140b which handles error messages. The find service 140*b* then selects another connection 304 in state 1822. While in state 1822 the find service 140 executes the select connection routine described above.

In state 1806, the find service 140*b* send the result code 410 and the hit count 412 to the find client 140*a*. Proceeding to state 1808, the find service 140*b* determines whether the search engines 500 located any offerings by evaluating the hit count 412. If the search engine 500 did not locate any offerings specified by the search terms the hit count 412 is zero and the find service 140*b* proceeds to return state 1816.

If the search engine 500 did locate offerings the hit count 412 specifies the number of located offerings. Proceeding to state 1810, the find service 140*b* obtains the offering identifier 232 for one of the offerings and sends the offering identifier 232 back to the find client 140*a*. Proceeding to state 1812, the find service 140*b* determines whether an offering identifier 232 was obtained from the hit list 414. If so, the find service 140*b* proceeds to state 1814 and sends the offering identifier 232 to the find client 140*a*. Proceeding to state 1810, the find service 140*a* reads the next offering identifier 232 from the hit list 414. This process continues until all the offering identifiers 232 for the located offerings have been sent back to the find client. Proceeding to state 1816, the find service 140*b* returns to state 1526 shown in FIG. 15.

FIG. 14 illustrates an example of a search request the contains the "mortgage search term." The results of the search request are displayed in a result pane 1400. In this example, the search results include the mortgage calculator node 202*g*, the mortgage chat room node 202*e* and the mortgage rate information node 202*f*. Preferably, the results pane 1400 includes the name of the node 202, the type of the node 202 and the date the mode was modified.

After executing a search request in state 1526, the find service 140*b* returns to state 1506 where it waits for the next client request.

IV. Creating And Updating Indexes

Turning now to the creation of the indexes 502, the index module 310 of the present invention creates and updates the indexes 502. The index module 310 (hereinafter referred to as the index service 310) contains the indexes, software instructions and data structures which accommodate a variety of indexing schemes.

A. The Index Service Architecture

In the preferred embodiment, the index service includes one or more servers 120 which are Pentium-class (or better) microcomputers. In addition, the servers 120 in the index service 310 run the Windows NT operating system available from Microsoft Corporation. The servers 120 in the index service 310 typically have at least 128 MB of random-access memory (RAM) and at least 4 GB of disk space and communicate with other services via network connections over the local area network 122.

The separation of the servers 120 in the index service 310 from the servers 120 in the find service 140*b* and the connection servers 302 provides a number of advantages. For example, the processing of the search requests can continue while the index service 310 creates new indexes 502 or updates existing indexes. In addition, the separation of the index service 310 from the other services reduces the degradation in performance that occurs when the updating of an index 502 is executed on the same server 120 as the server 120 which processes the search requests.

During initialization, the index service 310 obtains connection server 302 information and index information from the Windows NT service registry. From the service registry, the index service 310 obtains the names of the connection servers 302, the indexed service identifier 230, the names of index libraries and index update times. The index service 310 uses this information to build an index table 1900 and an index schedule table 2000 as shown in FIGS. 19 and 20.

Referring now to FIG. 19, the index table 1900 associates a connection server 302 with an index connection 316 and an index library. Preferably, the index table 1900 contains four columns and a row for each connection server 302. The first column 1902 lists the names of the connection servers 302.

The second column 1904 contains the index service identifiers 230 that identify the indexes 502 in the connection server 302. The third column 1906 contains the name of an index connection 316. An index connection 316 establishes a communications link between the index service 310 and one of the connection servers 302. As described in more detail below, the index connections 316 provide a unique system for updating the indexes 502 in the connection servers 302.

The fourth column 1908 contains the name of the index dynamic link library associated with a particular index 502. An index dynamic link library is the software routine that indexes the content existing in the services. In the preferred embodiment, the index service 310 contains two indexing routines called DSINDEX and DSCOPY. As discussed in more detail below, the these indexing routines perform different indexing techniques. While the current embodiment has two indexing routines, it is envisioned that as the on-line network 100 grows in size, additional indexing routines will be added to the index service 310.

Preferably, implementing the indexing routines as dynamic link libraries allows the index service 310 to dynamically load the indexing routines as needed to index the content in the services. This reduces the amount of processing resources consumed by the index routines. In addition, the dynamic link library implementation allows the use of different indexing routines that implement different indexing techniques.

Referring now to FIG. 20, the index schedule table 2000 is shown. The index schedule table 2000 associates a time of the day with a list of connection servers 302 and indexes 500. The index service 310 uses the index schedule table 2000 to determine when the indexes 502 in particular connection servers 302 need updating. The first column 2002 contains a time of day. The second column 2004 contains a list of connection servers 302 and indexes 502. After creating the index table 1900 and the index schedule table 2000 the index service 310 begins the process of creating and updating the indexes 502.

B. Initialization Of The Index Service

In the preferred embodiment, the index service 310 takes advantage of multithreading. Multithreading, like multiprocessing, is a technique which allows the simultaneous execution of different tasks. Multithreading is a special form of multitasking in which tasks originate from the same process or program. For example, the indexing software in the index service 310 executes as a separate process within the operating system. When an index 502 needs updating, the index software invokes a separate execution thread for the updating task. Thus, each index update is treated as a separate task.

Because conventional operating systems schedule threads for independent execution, both the monitoring of the update schedule and the updating of a particular index 502 can proceed at the same time (concurrently). In the preferred embodiment, the index thread monitors the update schedule. When an index needs updating, the index thread invokes an update thread which updates the indexes 502.

Figure 21:
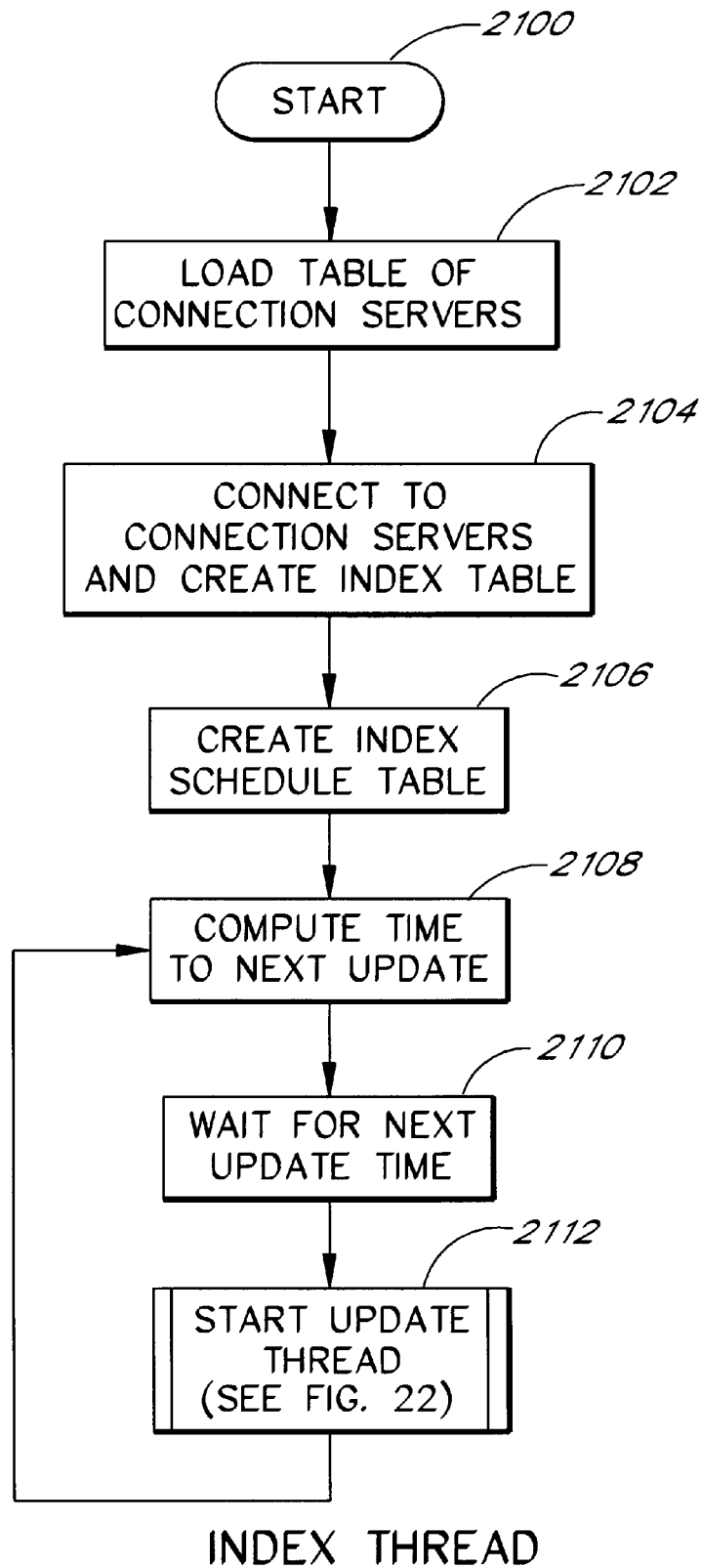
FIG. 21 is a flow chart illustrating a routine which initializes the index module and monitors the update schedule for different indexes one presently preferred embodiment of the present invention.

Referring now to FIG. 21, a flow chart of the index thread is shown. Beginning in a start state 2100, the index thread proceeds to state 2102 and accesses the Windows NT system registry to obtain the name of the connection servers 302 and the name of the indexing routine which updates the indexes in each connection server 302. While the preferred embodiment accesses the system registry in the Windows NT operating system, a person of ordinary skill in the art will recognize that tables, arrays, data structures, databases, and other registries can be used to list each connection server 302 and the indexing routine which updates the index 502 in each connection server 302.

Proceeding to state 2104, the index service 310 establishes an index connection 316 with each connection server 302. Each time the index service 310 establishes an index connection 316, the index service 310 adds the name of the connection server 302, the name of the index connection 316 and the name of the associated indexing routine to the index table 1900. For example, when the index service 310 establishes an index connection 316 with the first connection server 302a, the index service 310 stores the name of the first connection server 302a into the first column 1902 of the index table 1900, the indexed service identifiers 230 in the second column 1904, the name of the connection 316 into the third column 1906, and the names of the indexing routines into the fourth column 1908.

Proceeding to state 2106, the index service 310 creates the index schedule table 2000. While in state 2106, the index service 310 accesses the Windows NT service registry to obtain the update times associated with each index 502 in each connection server 302. The update times are predefined by the on-line network provider 100. At initialization, the index service 310 reads the update times from the system registry.

When building the index schedule table 2000, the index service 310 loads an update time in the first column 2002. Furthermore, the index service loads the list of connection servers 302 and indexes 502 in the second column 2004. For example, if at 8:00 am the network provider assigns the index service 310 to update index1 502a in the first and second connection servers 302a and 302b, the index schedule table 2000 contains the time 8:00 am, the names of the first and second connections servers 302a and 302b and the name of index1.

In addition, to reading the update times at initialization, the index service 310 monitors the system registry for update schedule modifications. In the preferred embodiment, the index service 310 monitors the system registry with the Win 32 RegNotifyChangeKeyValue application programming interface. The techniques for monitoring the system registry and the RegNotifyChangeKeyValue application programming interface are well know in the art and are described in *The Win* 32 *Programmer's Reference Vol. II*, Microsoft Press, 1993, pp. 266–301 and the *Win* 32 *Programmer's Reference Vol. IV*, Microsoft Press, 1993, pp. 377 which are hereby incorporated by reference. When an update modification occurs, the index service 310 modifies the entries in the index schedule table 2000.

Proceeding to state 2108, the index service 310 computes the time to the next update. For example, if it is 6:00 am, the index service 310 determines that it needs to update an index 502 in two hours at 8:00 am. When a change to the index schedule table 2000 occurs, the index service 310 recomputes the time to the next index update in state 2108. Proceeding to state 2110, the index service 310 waits for the next update time. For example, the index service 310 proceeds to state 2110 and waits for two hours until 8:00 am. When it is time to update an index 502, the index service 310 proceeds to state 2112.

In state 2112, the index service 310 invokes an update thread to update the desired indexes 502 existing in the list of connection servers 302. In the preferred embodiment, the updating of an index 502 is performed in a separate execution thread, however one of ordinary skill in the art will recognize that other techniques such as procedure calls, subroutines and the like can be used to update the indexes 502.

C. Updating Indexes

The update thread updates the indexes 502 in the connection servers 302. To do so, the update thread notifies a connection server 302 that one of its indexes 502 is scheduled for updating. The connection server 302 then sends a shutdown request to the find service 140b which directs the find service 140b to route search requests to other connection servers 302. Once the search engines 500 that search the specified index within the connection server 302 are idle, the index service 310 updates the specified index 502. After updating the index 502, the find service 140b routes new search requests to the idled search engines 500.

Figure 22:
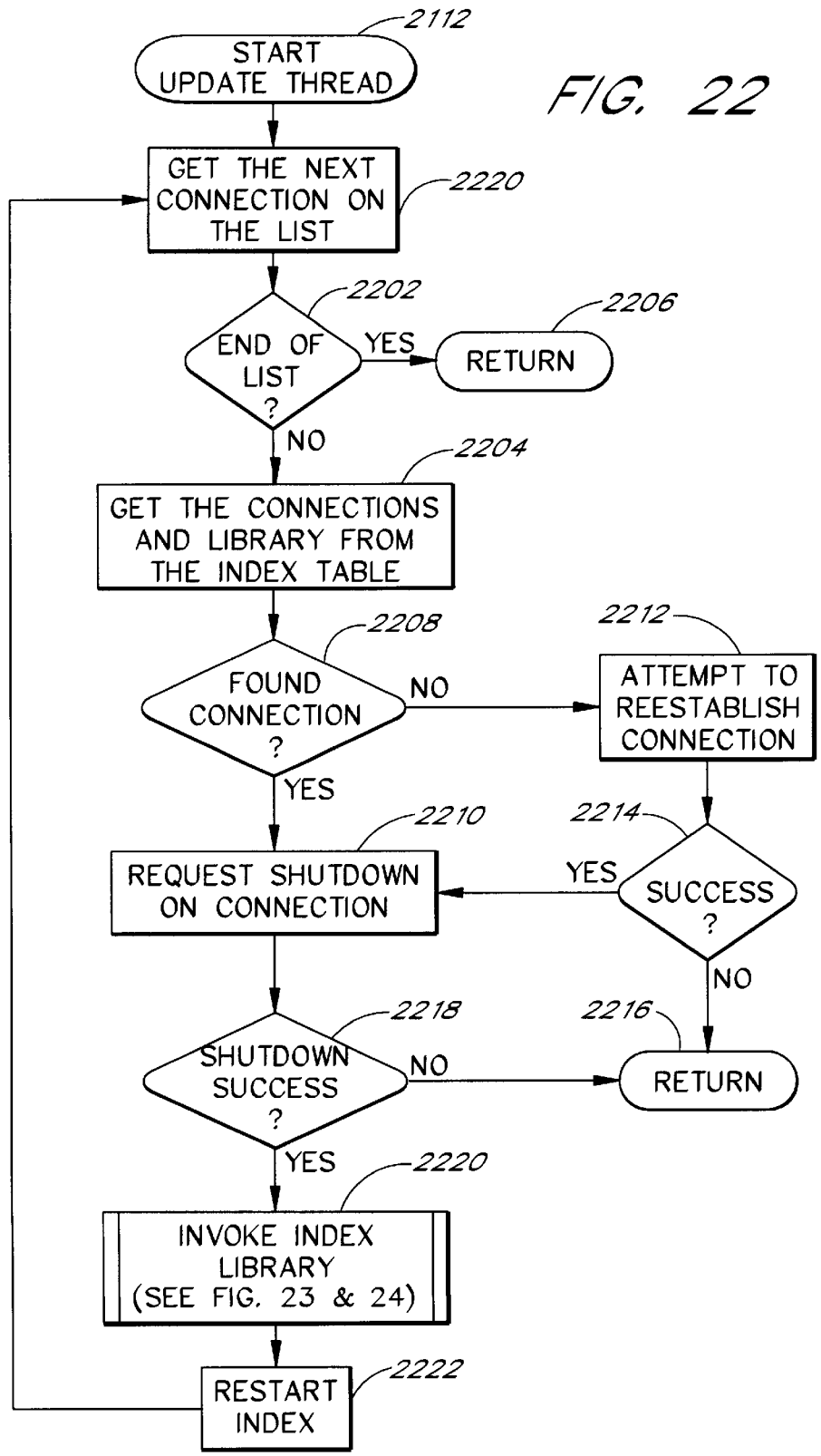
FIG. 22 is a flow chart illustrating a routine which updates an index in one presently preferred embodiment of the present invention.

FIG. 22 illustrates a flow chart of the execution states in the update thread. When the index thread invokes the update thread in state 2112, the index thread passes the list of connection servers 302 that are scheduled for updating. After invocation in start state 2112, the update thread proceeds to state 2200 and obtains the name of a connection server 304 from the list. Proceeding to state 2202, the update thread determines whether the update thread has reached the end of the list. If so the update thread proceeds to return state 2206. In this example, the update index has obtained the name of the first connection server 302a and proceeds to state 2204.

In state 2204, the update thread obtains the name of the index connection 316 and the name of the index library from the index table 1900. For example, the update thread obtains the name of the index connection 316 which links the index service 310 with the first connection server 302a. Proceeding to state 2206, the update thread attempts to communicate with the connection server 302a. If the connection is functional, the update thread proceeds to state 2208.

Returning to state 2208, if the index connection 316 is not functional due to an error, the update thread proceeds to state 2212 and attempts to reestablish an index connection 302. If the update thread is unsuccessful in establishing an index connection 316 (i.e., the connection server 302 is not operational), the update thread proceeds to return state 2216 and returns control back to the index thread. For example, if the connection server 302 is not operational, the update thread will not successfully establish an index connection 316 with the connection server 302 and proceeds to return state 2216.

In state 2214, if the update thread does successfully reestablish an index connection 316 with the connection server 302, the update thread proceeds to state 2210. In state 2210 the update thread sends a shutdown message to the connection server 302 that specifies the index that needs updating. In response, the connection server 302 routes the shutdown message to all the find services 140b connected to the connection servers 302.

When the find service 140b receives the shutdown message, the find service 140b ceases sending search requests to the search engines 500 which search the specified index in the connection server 302. During this period, the find service 140b waits until all pending search requests are complete. In addition, the find service 140b routes new search requests to other connection servers 302. When the search engines 500 in the connection server 302 have completed all the pending search requests, the find service 140b notifies the connection server 302 that the shut down is complete. The connection server 302, then notifies the update thread that the shut down is complete.

For example, referring to FIG. 5, if the update thread desires to update index1 502a in connection server 302a, the update thread sends a shutdown request to connection server 302a. The first connection server 302a sends the shutdown message to the find service 140b. The find service 140b then routes new search requests to the search engines 500 in other connection servers 302. In addition, the find service 140b waits until search engines 500a and 500b (search engines 500a and 500b search index1 502a) have completed all pending search requests. Once search engines 500a and 500b are idle, the find service 140b notifies the connection server 302a that the shut down is complete. The connection server 302a then notifies the update thread that the shut down is complete. Thus, if the connection server 302 contains more than one type of index 502, the connection server 302 and find service 140b only shut down the search engines 500 searching the index 500 scheduled for updating.

Proceeding to state 2218, the update thread determines whether the shutdown message was successful. If the find service 140b is unable to shut the desired connection server 302 down, the update thread proceeds to return state 2216 and notifies the index thread that an error has occurred. However, if the connection server 302 notifies the index service 310 that shut down is complete, the update thread proceeds to state 2220.

In state 2220, the update thread invokes the proper indexing routine (the update thread obtained the name of the indexing routine from the index table 1900). The indexing routine then updates the desired index 502 in the connection server 302. The process of updating the index 502 with the index routines further discussed in the section entitled "The Index Update Routines."

Upon completion of an index update, the update thread proceeds to state 2222 and notifies the connection server 302 that the update is complete. While in state 2222, the connection server 302 notifies the find service 140b to route new search requests to the connection server 302. Advantageously, this unique updating mechanism only idles one connection server 302 while other connection servers 302 continue to process the search requests. As a result, the find system of the present invention doesn't cease operations during an index update.

D. The Index Update Routines

In the current embodiment, the index table 1900 specifies either the DSINDEX or the DSCOPY dynamic link libraries. The DSINDEX dynamic link library (hereinafter referred to as the DSINDEX routine) performs indexing by deleting the current index 502 in the connection server 302 and generating a new index 502 from scratch. The DSCOPY dynamic link library (hereinafter referred to as the DSCOPY routine) performs index updating by copying a previously created updated index 502 to one of the connection servers 302. Furthermore, the unique implementation of the present invention allows other index routines using different updating techniques to be added. For example, an index routine could be added that updates an index incrementally so as to add the changes to an index since the last update. In addition, as new services are added to the on-line network, new types of indexing routines can also be added.

Figure 23:
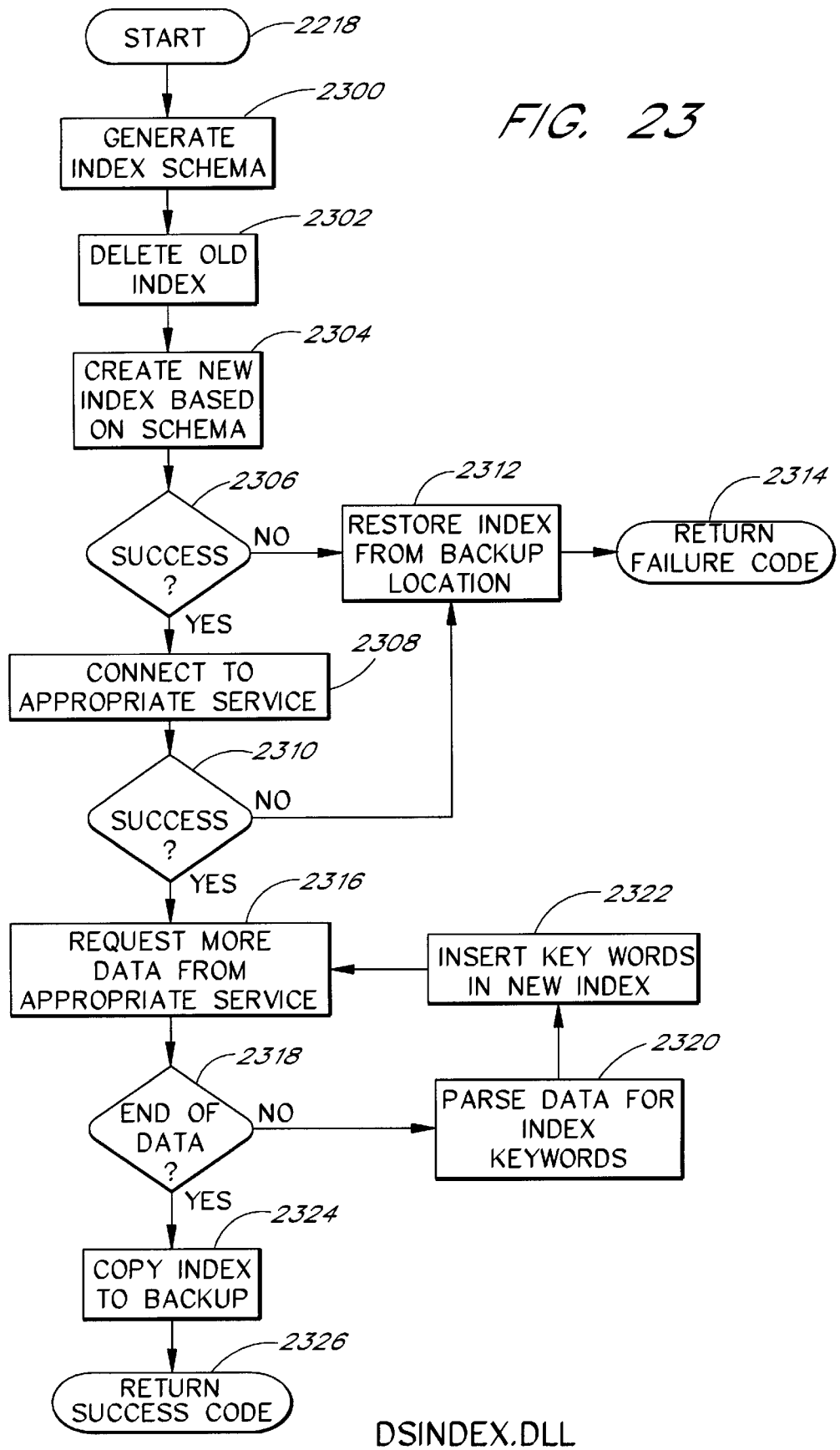
FIG. 23 is a flow chart illustrating one embodiment of an index library in the present invention.

Referring now to FIG. 23, a flow chart of the DSINDEX routine is shown. Beginning in a start state 2218, the DSINDEX routine proceeds to state 2300 and generates an index schema. An index schema defines the attributes (or fields) in an index. For example, the index schema defines the categories, search terms and types of data contained in the index 502. Typically the index schema is predefined by a software developer. In the preferred embodiment, the index schema is defined by the Fulcrum® SearchServer™ software specifies search terms such as key words, the Name 1204, the Topic 1206, the Description 1208, the Place 1216, the security tokens 220, the subject property 228, the people property 236, the places property 238 and the locals property 240. As new search terms are added, the index schema is altered by the software developer to include the new search terms.

Proceeding to state 2302, the DSINDEX routine deletes the old index 502 in the connection server 302. If the connection server 302 contains more than one index 500, the DSINDEX routine deletes the index 500 specified in the index schedule table 2000. As explained below the DSINDEX routine creates a backup copy of each index 502. Thus when the DSINDEX routine deletes the old index 502, the DSINDEX routine keeps a backup copy of the old index 502. After deleting the old index 502, the DSINDEX routine creates a new empty index 502 in state 2304. A new empty index 502 contains the index format, but does not yet have the data to create the index 502. Proceeding to state 2306, the DSINDEX routine determines whether the creation of the new empty index 502 was successful.

If the DSINDEX routine determines that the creation of the new empty index 502 was not successful, the DSINDEX routine proceeds to state 2312 and restores the backup copy of the old index 502 onto the connection server 302. The DSINDEX routine then proceeds to state 2314 and returns a failure code that indicates the index 502 could not be updated.

Returning to state 2306, if the DSINDEX routine determines that the creation of the new empty index 502 was successful, the DSINDEX routine proceeds to state 2308. In state 2308, the DSINDEX routine attempts to connect to the service associated with the index 502. For example, if the index 502 indexes the offerings in the DirSrv service 134, the DSINDEX routine attempts to establish a network connection with the DirSrv service 134. Establishing the network connection creates a communication link via the local area network 122 which allows the DSINDEX routine to access the content of the DirSrv service 134.

If, in state 2310, the DSINDEX routine is unable to establish a network connection with the DirSrv service 134, the DSINDEX routine proceeds to state 2312 and restores the backup copy of the old index 502. Proceeding to state 2314, the DSINDEX routine creates an error message indicating that the DSINDEX routine could not connect with the desired service.

If, in state 2310, the DSINDEX routine does connect to the desired service, the DSINDEX routine proceeds to state 2316 and requests content data from the service and begins indexing it. In the preferred embodiment, the Fulcrum indexing software creates the new index 502. A person of ordinary skill in the art, however, will recognize that a wide variety of indexing programs using commonly known techniques can create the new index 502. Due to the large amounts of data that may exist in an service, the service sends incremental portions of the content data to the DSINDEX routine. In the preferred embodiment, the DSINDEX routines obtain 32 kilobytes of incremental data; however, the amount of incremental data can vary.

Proceeding to state 2318, the DSINDEX routine determines whether it has obtained all the content data from the selected service. In this example, the DSINDEX routine is just beginning to index the service content and proceeds to state 2320. In state 2320, the indexing software uses commonly known techniques for creating the key words which associate a search term with a particular offering in the service. In addition, in state 2322, the indexing software uses commonly known techniques for adding the key words to the index 502.

Proceeding to state 2316, the DSINDEX routine requests additional content data from the service. This process continues until all the content data has been indexed. Once the content data has been indexed, the DSINDEX routine proceeds to state 2324 and makes a backup copy of the newly created index 502. The backup copy is stored in the index service 310 and is used to restore indexes 502 when errors occur. Proceeding to state 2326 the DSINDEX routine returns a success code to the update thread in state 2218.

Figure 24:
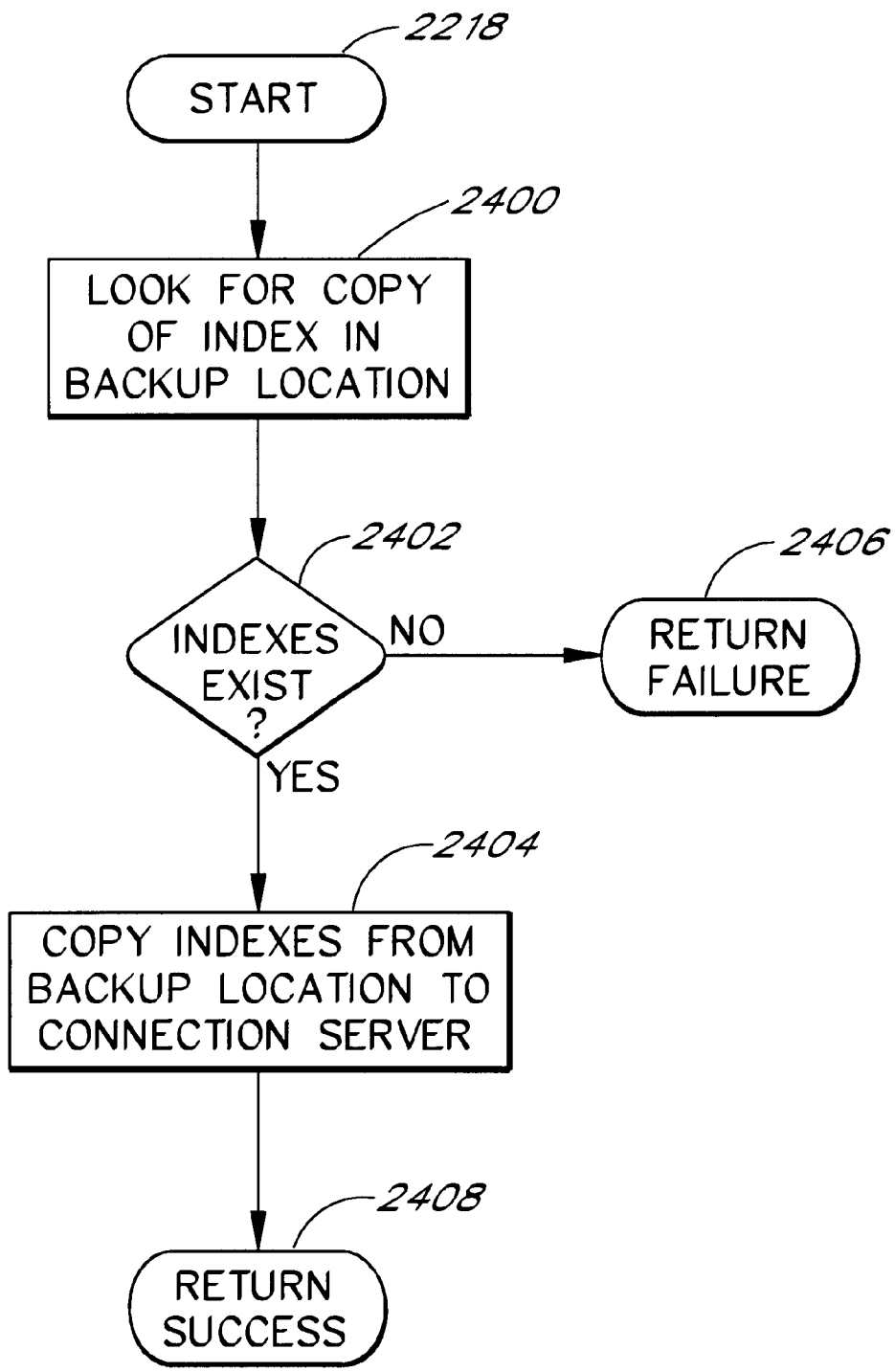
FIG. 24 is a flow chart illustrating another embodiment of an index library in the present invention.

In addition to the DSINDEX routine, the index table 1900 can direct the update thread to call the DSCOPY routine in state 2218. FIG. 24 illustrates a flow chart of the DSCOPY routine. The DSCOPY routine does not create an updated index 502. Instead, the DSCOPY routine copies a previously updated index 502 to the connection servers 302. For example, once the DSINDEX routine creates a newly updated index 502, the DSCOPY routine can copy the updated index 502 to other connection servers 302.

After invocation in a start state 2218, the DSCOPY routine proceeds to state 2400 and looks for a copy of the updated index 502 in the backup location. As explained above, when an index library creates a new index 502, the index library stores the index 502 in a backup location within the index service 310. In the preferred embodiment, the updated indexes 502 are stored in a backup directory on the hard disk of the index service 310.

Proceeding to state 2402, if the DSCOPY routine cannot find the updated index 502 in the backup location, the DSCOPY routine returns an failure message to the update thread in state 2406. However, if the updated index 502 exists in the backup location, the DSCOPY routine proceeds to state 2404. In state 2404, the DSCOPY routine copies the updated index 502 from the backup location to the connection server 502 and returns a success message in return state 2408. The DSCOPY routine then returns control back to the update thread in state 2218.

Thus the unique architecture of the indexing service 310 provides a number of advantages. For instance, the unique indexing architecture can accommodate a wide variety of indexing schemes which are tailored to the content stored in the different services. Accordingly, the present invention is capable of creating different indexes 502 for different portions of the on-line network 100. Furthermore, once an index 502 is updated, the index service 310 can quickly copy the index 502 to other connection servers 302 or incrementally update those portions of the index that have changed since the last update.

V. Validating Security Clearances

The offerings in an on-line network 100 are constantly changing; however, the indexes 502 are updated at predetermined update intervals (i.e, every evening, every two hours, etc.) Thus, an index 502 does not include new changes until the next update. Fhe end-user, however, desires to view the up-to-date properties associated with an offering. For example, if the name property 210 has changed, the find system needs to display the up-to-date name property 210. In addition, security problems can arise when security access rights are modified.

In order to obtain up-to-date node properties 208, one embodiment of the invention uses the services. The offering identifiers 232 located by the search engines are sent to the service containing the identified offerings and the service then obtains the up-to-date properties associated with each offering identifier 232. In addition, one embodiment of the present invention performs a two stage security check that 1) utilizes a user's security clearance when locating offering identifiers 232 in an index 502 and 2) accesses each of the offerings identified by the offering identifiers 232 to obtain their up-to-date security clearances.

In the first stage, as discussed above, the end-user's assigned security tokens 220 are used as search terms in the connection query message 404. As a result, the search engines 500 only locate those offering identifiers in an index 502 corresponding to the user's assigned security tokens 220. The list of these offering identifiers 232 are then sent to the find client 140a existing in the local computer 102.

Because modifications made after an index update do not exist in the index 502, the present invention proceeds to the second stage and directs the service to 1) obtain the up-to-date properties for each of the located offerings and 2) perform a security check on the up-to-date security clearance. For those offerings that contain the proper security clearance, the service sends the up-to-date list of properties 208 to the find client 140a which then displays the properties in the results pane 1400.

A. Accessing A Service to Validate Security Clearances

In the present invention, when the find client 140a receives the hit list 414 of located offering identifiers 232, the find client 140a then directs the services to obtain the up-to-date properties of the identified offering and perform the second stage security check. Referring to FIG. 11, the second stage security check is performed in state 1112. While in state 1112, the find client 140a sends the hit list 414 of located offerings identifiers 232 to the services in the on-line network to obtain the up-to-date properties and to direct the services to perform the second stage security check.

In the on-line network 100 appropriate for use with the find system, offerings are associated with different services. For example, the nodes 202 in the DirSrv namespace 106b are associated with the DirSrv service 134. Thus, to obtain a node's up-to-date properties 208, the find client 140a establishes a network connection with the DirSrv service 134 and sends the hit list of offering identifiers 232 to the DirSrv service.

The DirSrv service 134 uses the offering identifiers to access the nodes 202 existing in the DirSrv service. In response, the DirSrv service 134 accesses the identified nodes 202 and obtains the node's the up-to-date properties 208 including the node's up-to-date security tokens 220. In addition, the DirSrv service performs the second stage security check by sending (1) each node's up-to-date security token 220 and (2) the end-user's account number to the security service 150.

The security service 150 uses the end-user's account number to identify the security tokens 220 assigned to the end-user. The security service 150 then compares the end user's security tokens 220 with each node's up-to-date security token 220 to determine whether the end-user has the proper security clearance to view each node 220. The DirSrv service then only sends the up-to-date list of properties 208 for those nodes with the proper security clearance to the find client 140a. The find client 140a then displays the up-to-date properties 208 in the results pane 1400.

If the find client 140a receives offering identifiers 232 from more than one service, the find client 140a repeats the process for each service. Consequently, the find client 140a spends valuable processing time establishing network connections with each of the services. This can lengthen response times and increase on-line network 100 communications traffic.

B. The Node Broker

In another embodiment of the present invention, a node broker module 312 obtains the up-to-date properties 208 and performs the second stage security check. The node broker module 312 (hereinafter referred to as the node broker 312) is shown in FIG. 3B. The node broker 312 includes one or more servers 120 which are Pentium-class (or better) microcomputers. In addition, the node broker servers 120 run the Windows NT operating system. The servers 120 in the node broker 312 typically have at least 128 MB of random-access memory (RAM) and at least 4 GB of disk space. The servers 120 in the index service 310 communicate with other services via the local area network 122.

Figure 25:
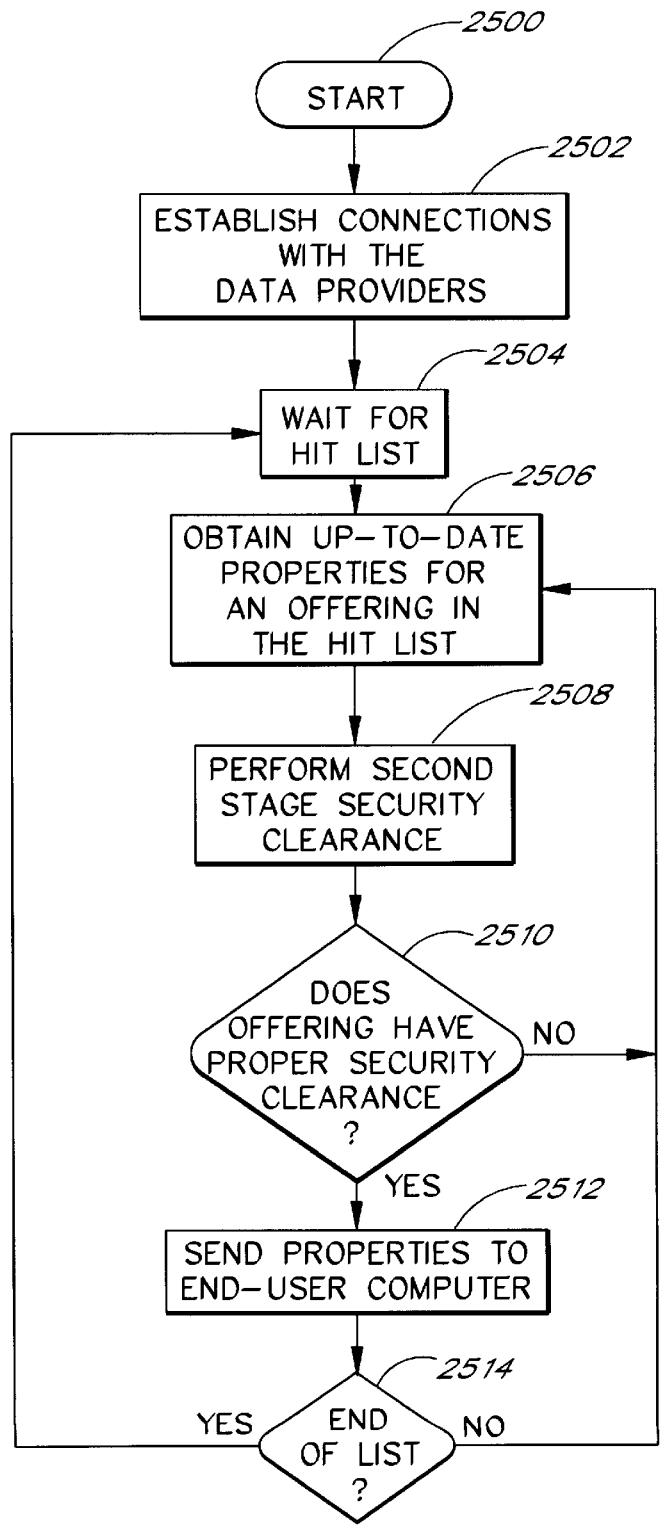
FIG. 25 is a flow chart illustrating a node broker routine which obtains up-to-date security clearances in one presently preferred embodiment of the present invention.

The node broker 312 includes specialized software instructions designed to obtain each offering's up-to-date properties and to perform the second stage security check. Referring to FIG. 25, a flow chart of the execution states in the node broker 312 is shown. Beginning in a start state 2500, the node broker 312 proceeds to state 2502 and establishes at least one network connection with each indexed service. The node broker 312 obtains the name of each indexed service from the Windows NT system registry. The network connections link the node broker 312 with the indexed services via the local area network 122.

Proceeding to state 2504, the node broker 312 waits for the indexed service identifiers 230 and hit lists 414. In one embodiment, the find client 140a receives the indexed service identifiers 230 and the hit lists 414 from the find service 140b and then sends the indexed service identifiers 230 and the hit list 414 to the node broker 312. In an alternative embodiment, as discussed in more detail below, the find service 140b sends the indexed service identifiers 230 and hit lists 414 directly to the node broker 312.

Proceeding to state 2506, the node broker 312 obtains the up-to-date list of properties 208 for one of the offerings identified in the hit list 414. Specifically, the node broker 312 uses the indexed service identifier 230 to identify one of the services. The node broker 312 then selects one of the offering identifiers 232 from the hit list 414. The node broker 312 sends the offering identifier 232 to its corresponding service and the service then returns the up-to-date properties 208 for the node 202 identified by the offering identifier 232.

Proceeding to state 2508, the node broker 312 performs the second stage security check by sending 1) the up-to-date security token 220 in the up-to-date property list 208 and 2) the end-user's account number to the security service 150. The security service 150 then compares the security token 220 with the end-user's assigned security tokens 220. If the identified node 202 has the proper security clearance in state 2510, the node broker proceeds to state 2512 and sends the up-to-date list of properties 208 to the find client 140a.

If the identified node 202 does not have the proper security clearance, the node broker proceeds to state 2506 where it obtains the next offering identifier 2323 in the hit list 414. Thus, if the identified node 202 does not have the proper security clearance the up-to-date list of properties 208 is not sent to the find client 140a. Consequently, information about the located node 202 is not displayed in the results pane 1400.

Proceeding to state 2514, the node broker 312 determines if it has reached the end of the hit list 414. If not, the node broker 312 returns to state 2506 and obtains the next offering identifier 232 from the hit list 414. Once the node broker 312 reaches the end of the hit list 414, the node broker 312 proceeds to state 2504 and waits for another hit list 414. Thus, the node broker 312 greatly improves performance because the find client 140a does not need to establish different network connections with different services to obtain the up-to-date security tokens 220. This reduces wide area network 106 communication traffic, reduces the number of network connections in the on-line network 100 and improves response times.

In an alternative embodiment, find service 140b sends the indexed service identifiers 230 and hit lists 414 directly to the node broker 312. The node broker 312 obtains the up-to-date list of properties 208 and performs the second stage security check as described above. The indexed service identifiers 230, the hit list 414 and the up-to-date properties for the nodes 202 with the proper security clearances are then sent to the find client 140a. Thus, instead of having to send the indexed service identifiers 230 and the hit lists 414 back to the node broker 312, the find client 140a simply receives the up-to-date properties, the indexed service identifiers 230 and the hit lists 414. This increases response times because the hit lists 414 are only communicated once over the slower speed communication lines of the wide area network 106.

While the above detailed description has shown, described and pointed out the fundamental novel features of the invention as applied to a preferred embodiment, it will be understood that various omissions and substitutions and changes in the form and details of the illustrated device may be made by those skilled in the art without departing from the spirit of the invention. Consequently, the scope of the invention should not be limited to the foregoing discussion but should be defined by the appended claims.

What is claimed is:

1. A find system for locating offerings in an on-line network, comprising:
   at least one service existing in an on-line network, said service having a plurality of offerings accessible by a plurality of users;
   a plurality of query processing modules existing in said on-line network, each of said query processing modules having an index which associates a plurality of search terms with said offerings, said query processing modules configured to receive a plurality of search requests, said search requests containing said search terms, said query processing module configured to search said index to locate said offerings identified by said search terms; and at least one administrative module existing in said on-line network, said administrative module in communication with said query processing modules, said administrative module configured to receive said search requests, said administrative module further adapted to balance the processing loads of said query processing modules by selectively routing said search requests to said query processing modules.

2. The find system of claim 1 wherein said administrative module is further configured to create a query processing list, said query processing list containing each query processing module name, said administrative module further configured to use said query processing list to selectively route said search requests to said query processing modules based on said next query processing module name in said query processing list.

3. The find system of claim 1 wherein said administrative module is further configured to reroute said search request to a second query processing module when a first query processing module is unable to process said search request.

4. The find system of claim 1 wherein said query processing module contains a plurality of search engines, each of said search engines configured to receive said search requests, each of said search engines further configured to process said search requests by searching said index to locate said offerings related to said search requests.

5. The find system of claim 4 wherein said search engines execute as separate processes in each of said query processing modules.

6. The find system of claim 4 wherein said query processing modules establish a plurality of connections which connect said administrative module with said search engines, said connections configured to connect a first process with a second process, said first process and said second process executing in the same or different processors.

7. The find system of claim 6 wherein said query processing module contains an object-oriented data structure which allows said search engines to communicate with said connections with standardized method calls.

8. The find system of claim 6 wherein said connections are pipes.

9. The find system of claim 6 wherein said connections are sockets.

10. The find system of claim 6 wherein said administrative module creates a query processing list and a connection list, said query processing list listing said query processing modules, said connection list associating each of said query processing modules with said connections assigned to said query processing module, whereby said administrative module uses said query processing list and said connection list to selectively route said search requests to said connections in order to balance the processing loads in said query processing modules.

11. The find system of claim 4 wherein said query processing module is adapted to store a plurality indexes, each of said indexes corresponding to one of a plurality of services, wherein each of said search engines in each of said query processing modules is assigned to search one of said indexes.

12. The find system of claim 11 wherein said services are uniquely identified with a plurality of service identifiers.

13. The find system of claim 12 wherein each of said query processing modules establish a plurality of connections, each of said connections linking said administrative module with one of said search engines.

14. The find system of claim 13 wherein said query processing module is configured to create a service identifier list, said service identifier list associating each of said service identifiers with one of said indexes.

15. The find system of claim 14 wherein said service identifier list further associates each of said service identifiers with said connections.

16. The find system of claim 12 wherein each of said search requests contain at least one of said service identifiers and at least one of said search terms.

17. The find system of claim 16 wherein said administrative module is further configured to route said search requests to said connections based on said service identifier in said search requests and said service identifier list.

18. A index system for indexing the content of offerings in an on-line network, the index system comprising:

a plurality of services existing in the on-line network, each of the services having a plurality of offerings accessible by a plurality of users;

an index module existing in the on-line network, said index module in communication with said services, said index module configured to create a plurality of different indexes with different indexing routines, each of the indexes associating search terms with the offerings in one of the services; and a plurality of query processing modules existing in said on-line network, said query processing modules in communication with said index module, said query processing modules configured to receive a plurality of search requests, said query processing modules further configured to periodically receive one of said indexes, said query processing modules adapted to process said search requests by searching said indexes to locate said offerings identified by said search terms.

19. The index system of claim 18 wherein one of said query processing modules temporarily suspends processing of said search requests while said index module updates one of said indexes existing in said query processing module.

20. The index system of claim 19 wherein said index routines copy said updated index to said query processing modules.

21. The index system of claim 18 further comprising at least one administrative module existing in said on-line network, said administrative module in communication with said plurality of query processing modules, said administrative module configured to receive a plurality of search requests and route said search requests to said query processing modules.

22. The index system of claim 21 further wherein said administrative module is configured to route said search requests to other query processing modules when one of said indexes in a first query processing module is updated by said index module.

23. A find system for locating offerings in an on-line network, comprising:

at least one end-user station, said end-user station configured to send a search request to an on-line network, said search request configured to contain at least one search term;

at least one service existing in said on-line network, said service having a plurality of offerings accessible by a plurality of users, each of said offerings assigned a security access level;

a plurality of query processing modules existing in said on-line network, said query modules in communication with said end-user station and configured to receive said search request, said query processing modules further configured to periodically receive an updated index which associates said search terms in said search requests with said offerings in said service, said query processing modules further configured to process said search requests by searching said index to locate said offerings related to said search terms; and a security module in said on-line network, said security module in communication with said service, said security module configured to obtain a current security access level for each of said located offerings.

24. The find system of claim 23 wherein said query processing module contains a cache, said cache configured to store a security access level assigned to an end-user.

25. The find system of claim 24 wherein said cache stores said end-user security access level during an end-user logon session.

26. The find system of claim 23 wherein said query processing module is configured to combine said search requests with said end-user security access level.

27. The find system of claim 26 wherein said index contains said security access levels assigned to said offerings.

28. The find system of claim 27 wherein said query processing module uses said end-user security access level as one of said search terms when searching said index in order to locate a plurality of offering identifiers corresponding with said end-user access level.

29. The find system of claim 28 wherein said end-user station is configured to send said offering identifiers to a node broker module, wherein said node broker module is configured to obtain said current security access levels from said service.

30. The find system of claim 29 wherein said node broker module is configured to compare said current security access levels from said service with a security access level assigned to said end-user to identify said offerings corresponding to said end-user security access level.

31. The find system of claim 28 wherein said query processing module is configured to send said offering identifiers to said node broker module.

32. A find system for locating offerings in an on-line network, comprising:

at least one service existing in an on-line network, said service having a plurality of offerings accessible by a plurality of users;

a plurality of query processing means for processing a plurality of search requests to locate said offerings identified by said search request, each of said query processing means searching an index which associates a plurality of search terms in said search requests with said offerings;

an administrative means for selectively routing said search requests to said query processing means in order to balance the processing loads placed on said query processing means; and an index means for updating a plurality of different indexes with different indexing routines, said index means in communication with said query processing means, said index means notifying one of said query processing means of an index update, wherein said query processing means and said administrative means interact to route said search requests to other of said query processing means while said index means updates said index in said query processing means.

33. The find system of claim 32 wherein said query processing means communicates with an external data source, said query processing means receiving a plurality of search requests and routing said search requests to said external data source to obtain said offerings in said external data source related to said search requests.

34. The find system of claim 32 further comprising a security means for obtaining a current security access level for each of said located offerings from said service.

35. A method of locating offerings in an on-line network comprising the steps of:

sending a search request to at least one administrative module existing in an on-line network, said administrative module in communication with a plurality of query processing modules, each of said query processing modules containing a plurality of search engines;

selectively routing said search request to one of said search engines in a manner that balances the processing loads in said query processing modules; and processing said search request in one of said search engines to locate a plurality of offerings in a service.

36. The method of claim 35 wherein each of said search engines execute as separate processes in each of said query processing modules.

37. The method of claim 35 further comprising the step of establishing a plurality of connections which connect said administrative module with said search engines.

38. The method of claim 35 wherein said step of selectively routing further comprises routing a first search request to one of said search engines in a first query processing module and routing a second search request to one of said search engines in a second query processing module.

39. The method of claim 35 further comprising the step of rerouting said search request to a second search engine when a first search engine is unable to process said search request.

40. The method of claim 35 further comprising the steps of:

creating a plurality of indexes, each of said indexes corresponding to one of said services; and assigning each of said search engines to search one of said indexes.

41. The method of claim 40 further comprising the step of assigning a unique service identifier to each of said services.

42. The method of claim 41 further comprising the step of combining said service identifiers with said search requests.

43. The method of claim 42 wherein said step of selectively routing said search requests further comprises routing said search requests to said search engines based on said service identifier in said search requests.

44. The method of claim 35 further comprising the step of caching an end-user security access level for each of a plurality of end-users during a logon session.

45. The method of claim 44 further comprising the step of combining said search requests from one of said end-users with said end-user security access level assigned to said end-user.

46. The method of claim 45 further comprising the step of creating an index, said index containing a plurality of search terms and a plurality of security access levels for said offerings.

47. The method of claim 46 wherein said step of processing said search queries in one of said search engines further comprises searching said index to locate said offerings corresponding to said end-user access levels.

48. The method of claim 47 wherein said step of obtaining said current security access levels further comprises obtaining said current security access levels from a service.

49. The method of claim 35 further comprising the step of obtaining a current security access level for each of said located offerings.

50. The method of claim 49 further comprising the steps of:

comparing said current security access levels with said end-user access level to identify said located offerings corresponding to said end-user access level; and displaying only said located offerings corresponding to said end-user access level.

51. A method of indexing the content of offerings in an on-line network, the method comprising the steps of:

accessing the information content in a plurality of services existing within the on-line network;

creating a plurality of different indexes with different indexing routines, each of the indexes associating search terms with the offerings existing in one of the services;

selectively invoking the indexing routines to update the indexes;

processing a plurality of search requests with a plurality of query processing modules existing in said on-line network, said query processing modules adapted to process said search requests by searching said indexes to locate said offerings related to said search requests; and periodically updating said indexes in said query processing modules.

52. The method of claim 51 further comprising the step of routing said search requests to a second query processing module while updating one of said indexes in a first query processing module.

53. A computer readable medium having instructions stored thereon for causing a computerized system to perform a method of locating offerings in an on-line network comprising:

sending a search request to at least one administrative module existing in an on-line network, said administrative module in communication with a plurality of query processing modules, each of said query processing modules containing a plurality of search engines;

selectively routing said search request to one of said search engines in a manner that balances the processing loads in said query processing modules; and processing said search request in one of said search engines to locate a plurality of offerings in a service.

54. The computer readable medium of claim 53 and further comprising instructions for causing the computerized system to:

obtain a current security access level for each of said located offerings;

compare said current security access levels with said end-user access level to identify said located offerings corresponding to said end-user access level; and display only said located offerings corresponding to said end-user access level.

55. The computer readable medium of claim 53 and further comprising instructions for causing the computerized system to:

create a plurality of indexes, each of said indexes corresponding to one of said services; and assign each of said search engines to search one of said indexes.

56. The computer readable medium of claim 53 and further comprising instructions for causing the computerized system to create an index, said index containing a plurality of search terms and a plurality of security access levels for said offerings.

57. The computer readable medium of claim 53 wherein each of said search engines execute as separate processes in each of said query processing modules.

58. The computer readable medium of claim 57 and further comprising instructions for causing the computerized system to reroute said search request to a second search engine when a first search engine is unable to process said search request.

59. The computer readable medium of claim 53 and further comprising instructions for causing the computerized system to cache an end-user security access level for each of a plurality of end-users during a logon session.

60. The computer readable medium of claim 59 and further comprising instructions for causing the computerized system to combine said search requests from one of said end-users with said end-user security access level assigned to said end-user.

61. A computer readable medium having instructions stored thereon for causing a computerized system to perform a method of indexing content of offerings in an on-line network, comprising:

accessing the information content in a plurality of services existing within the on-line network;

creating a plurality of different indexes with different indexing routines, each of the indexes associating search terms with the offerings existing in one of the services;

selectively invoking the indexing routines to update the indexes;

processing a plurality of search requests with a plurality of query processing modules existing in said on-line network, said query processing modules adapted to process said search requests by searching said indexes to locate said offerings related to said search requests; and periodically updating said indexes in said query processing modules.

62. The computer readable medium of claim 61 and further comprising instructions for causing the computerized system to route said search requests to a second query processing module while updating one of said indexes in a first query processing module.

* * * * *